(12) United States Patent
Alexander et al.

(10) Patent No.: US 10,191,283 B2
(45) Date of Patent: Jan. 29, 2019

(54) SYSTEMS, DEVICES, AND METHODS FOR EYEBOX EXPANSION DISPLAYS IN WEARABLE HEADS-UP DISPLAYS

(71) Applicant: THALMIC LABS INC., Kitchener (CA)

(72) Inventors: Stefan Alexander, Elmira (CA); Matthew Bailey, Kitchener (CA); Vance R. Morrison, Kitchener (CA); Lloyd Frederick Holland, Kitchener (CA)

(73) Assignee: NORTH INC., Kitchener (CA)

( * ) Notice: Subject to any disclaimer, the term of this patent is extended or adjusted under 35 U.S.C. 154(b) by 0 days.

(21) Appl. No.: 15/046,269

(22) Filed: Feb. 17, 2016

(65) Prior Publication Data

US 2016/0238845 A1 Aug. 18, 2016

Related U.S. Application Data

(60) Provisional application No. 62/117,316, filed on Feb. 17, 2015, provisional application No. 62/156,736, (Continued)

(51) Int. Cl.
*G02B 5/32* (2006.01)
*G02B 27/01* (2006.01)
(Continued)

(52) U.S. Cl.
CPC ......... *G02B 27/0172* (2013.01); *G02B 26/10* (2013.01); *G02B 27/0081* (2013.01);
(Continued)

(58) Field of Classification Search
CPC .............. G02B 27/0093; G02B 27/017; G02B 27/0172; G02B 2027/0174; G02B 2027/0178
(Continued)

(56) References Cited

U.S. PATENT DOCUMENTS 3,408,133 A 10/1968 Lee
5,103,323 A 4/1992 Magarinos et al.
(Continued)

FOREIGN PATENT DOCUMENTS

JP 61-198892 A 9/1986
JP 2013-160905 A 8/2013
WO 2015/123775 A1 8/2015

OTHER PUBLICATIONS

Amitai, "P-27: A Two-Dimensional Aperture Expander for Ultra-Compact, High-Performance Head-Worn Displays," *SID Symposium Digest of Technical Papers* 36(1):360-363, 2005.
(Continued)

*Primary Examiner* — Audrey Y Chang
(74) *Attorney, Agent, or Firm* — Cozen O'Connor

(57) ABSTRACT

Systems, devices, and methods for eyebox expansion by exit pupil replication in wearable heads-up displays ("WHUDs") are described. A WHUD includes a scanning laser projector ("SLP"), a holographic combiner, and an exit pupil selector positioned in the optical path therebetween. The exit pupil selector is controllably switchable into and between N different configurations. In each of the N configurations, the exit pupil selector receives a light signal from the SLP and redirects the light signal towards the holographic combiner effectively from a respective one of N virtual positions for the SLP. The holographic combiner converges the light signal to a particular one of N exit pupils at the eye of the user based on the particular virtual position from which the light signal is made to effectively originate. In this way, multiple instances of the exit pupil are distributed over the eye and the eyebox of the WHUD is expanded.

16 Claims, 13 Drawing Sheets

Related U.S. Application Data filed on May 4, 2015, provisional application No. 62/242,844, filed on Oct. 16, 2015.

(51) Int. Cl.

| | |
|---|---|
| *G06F 3/01* | (2006.01) |
| *G02B 26/10* | (2006.01) |
| *G02B 27/00* | (2006.01) |
| *G03H 1/26* | (2006.01) |
| *G09G 3/00* | (2006.01) |
| *G02B 27/12* | (2006.01) |
| *G06F 1/16* | (2006.01) |

(52) U.S. Cl.
CPC ........... *G02B 27/017* (2013.01); *G02B 27/12* (2013.01); *G03H 1/265* (2013.01); *G03H 1/2645* (2013.01); *G06F 1/163* (2013.01); *G06F 3/011* (2013.01); *G06F 3/013* (2013.01); *G09G 3/001* (2013.01); *G02B 2027/0112* (2013.01); *G02B 2027/0123* (2013.01); *G02B 2027/0125* (2013.01); *G02B 2027/0174* (2013.01); *G02B 2027/0178* (2013.01); *G03H 2001/266* (2013.01)

(58) Field of Classification Search
USPC .................. 359/13, 15, 630; 345/8, 7; 353/7
See application file for complete search history.

(56) References Cited

U.S. PATENT DOCUMENTS

| | | | |
|---|---|---|---|
| 5,467,104 A | 11/1995 | Furness, III et al. | |
| 5,596,339 A | 1/1997 | Furness, III et al. | |
| 5,742,421 A | 4/1998 | Wells et al. | |
| 5,855,425 A * | 1/1999 | Hamagishi | G02B 27/2214 353/7 |
| 6,008,781 A | 12/1999 | Furness, III et al. | |
| 6,184,847 B1 | 2/2001 | Fateh et al. | |
| 6,204,829 B1 * | 3/2001 | Tidwell | G02B 7/287 345/7 |
| 6,236,476 B1 | 5/2001 | Son et al. | |
| 6,317,103 B1 | 11/2001 | Furness, III et al. | |
| 6,377,277 B1 | 4/2002 | Yamamoto | |
| 6,639,570 B2 | 10/2003 | Furness, III et al. | |
| 6,972,734 B1 | 12/2005 | Ohshima et al. | |
| 7,473,888 B2 * | 1/2009 | Wine | G02B 26/0841 250/208.1 |
| 7,640,007 B2 | 12/2009 | Chen et al. | |
| 7,684,105 B2 | 3/2010 | Lamontagne et al. | |
| 7,850,306 B2 | 12/2010 | Uusitalo et al. | |
| 7,925,100 B2 | 4/2011 | Howell et al. | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,666,212 B1 | 3/2014 | Amirparviz | |
| 8,704,882 B2 | 4/2014 | Turner | |
| 8,922,481 B1 | 12/2014 | Kauffmann et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 2001/0033402 A1 | 10/2001 | Popovich | |
| 2002/0003627 A1 | 1/2002 | Rieder | |
| 2002/0030636 A1 | 3/2002 | Richards | |
| 2002/0120916 A1 | 8/2002 | Snider, Jr. | |
| 2005/0012715 A1 | 1/2005 | Ford | |
| 2007/0132785 A1 | 6/2007 | Ebersole, Jr. et al. | |
| 2009/0207464 A1 | 8/2009 | Wiltshire et al. | |
| 2010/0149073 A1 * | 6/2010 | Chaum | G02B 27/0093 345/8 |
| 2012/0002256 A1 | 1/2012 | Lacoste et al. | |
| 2012/0139817 A1 | 6/2012 | Freeman | |
| 2012/0188158 A1 | 7/2012 | Tan et al. | |
| 2012/0249797 A1 | 10/2012 | Haddick et al. | |
| 2013/0016292 A1 | 1/2013 | Miao et al. | |
| 2013/0016413 A1 | 1/2013 | Saeedi et al. | |
| 2013/0135722 A1 | 5/2013 | Yokoyama | |
| 2013/0165813 A1 | 6/2013 | Chang et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0226193 A1 | 8/2014 | Sun | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0205134 A1 | 7/2015 | Bailey et al. | |
| 2015/0325202 A1 | 11/2015 | Lake et al. | |
| 2015/0362734 A1 | 12/2015 | Moser et al. | |
| 2015/0378161 A1 | 12/2015 | Bailey et al. | |
| 2015/0378162 A1 | 12/2015 | Bailey et al. | |
| 2015/0378164 A1 | 12/2015 | Bailey et al. | |
| 2016/0033771 A1 | 2/2016 | Tremblay et al. | |
| 2016/0202081 A1 | 7/2016 | Debieuvre et al. | |
| 2016/0274365 A1 | 9/2016 | Bailey et al. | |
| 2016/0274758 A1 | 9/2016 | Bailey | |
| 2016/0313899 A1 | 10/2016 | Noel | |
| 2016/0327796 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |
| 2016/0377865 A1 | 12/2016 | Alexander et al. | |
| 2016/0377866 A1 | 12/2016 | Alexander et al. | |
| 2017/0068095 A1 | 3/2017 | Holland et al. | |
| 2017/0097753 A1 | 4/2017 | Bailey et al. | |
| 2017/0115483 A1 | 4/2017 | Aleem et al. | |

OTHER PUBLICATIONS

Äyräs et al., "Exit pupil expander with a large field of view based on diffractive optics," *Journal of the SID* 17(8):659-664, 2009.
Chellappan et al., "Laser-based displays: a review," *Applied Optics* 49(25):F79-F98, 2010.
Cui et al., "Diffraction from angular multiplexing slanted volume hologram gratings," *Optik* 116:118-122, 2005.
Curatu et al., "Dual Purpose Lens for an Eye-Tracked Projection Head-Mounted Display," International Optical Design Conference 2006, *SPIE-OSA 6342*:63420X-1-63420X-7, 2007.
Curatu et al., "Projection-based head-mounted display with eye-tracking capabilities," *Proc. of SPIE* 5875:58750J-1-58750J-9, 2005.
Essex, "Tutorial on Optomechanical Beam Steering Mechanisms," OPTI 521 Tutorial, College of Optical Sciences, University of Arizona, 8 pages, 2006.
Fernández et al., "Optimization of a thick polyvinyl alcohol-acrylamide photopolymer for data storage using a combination of angular and peristrophic holographic multiplexing," *Applied Optics* 45(29):7661-7666, 2009.
Hainich et al., "Chapter 10: Near-Eye Displays," *Displays: Fundamentals & Applications*, AK Peters/CRC Press, 2011, 65 pages.
Hornstein et al., "Maradin's Micro-Mirror—System Level Synchronization Notes," SID 2012 Digest, pp. 981-984.
International Search Report, dated Jun. 8, 2016, for PCT/US2016/018293, 17 pages.
International Search Report, dated Jun. 8, 2016, for PCT/US2016/018298, 14 pages.
International Search Report, dated Jun. 8, 2016, for PCT/US2016/018299, 12 pages.
Itoh et al., "Interaction-Free Calibration for Optical See-Through Head-Mounted Displays based on 3D Eye Localization," 2014 IEEE Symposium on 3D User Interfaces (3DUI), pp. 75-82, 2014.

(56) References Cited

OTHER PUBLICATIONS

Kessler, "Optics of Near to Eye Displays (NEDs)," Presentation—Oasis 2013, Tel Aviv, Feb. 19, 2013, 37 pages.
Kress et al., "A review of head-mounted displays (HMD) technologies and applications for consumer electronics," *Proc. of SPIE 8720*:87200A-1-87200A-13, 2013.
Kress et al., "Diffractive and Holographic Optics as Optical Combiners in Head Mounted Displays," Proceedings of the 2013 ACM Conference on Pervasive and Ubiquitous Computing Adjunct Publication, pp. 1479-1482, 2013.
Kress, "Optical architectures for see-through wearable displays," Presentation—Bay Area—SID Seminar, Apr. 30, 2014, 156 pages.
Levola, "7.1: Invited Paper: Novel Diffractive Optical Components for Near to Eye Displays," *SID Symposium Digest of Technical Papers 37*(1):64-67, 2006.
Liao et al., "The Evolution of MEMS Displays," *IEEE Transactions on Industrial Electronics 56*(4):1057-1065, 2009.
Lippert, "Chapter 6: Display Devices: RSD™ (Retinal Scanning Display)," *The Avionics Handbook*, CRC Press, 2001, 8 pages.
Majaranta et al., "Chapter 3—Eye-Tracking and Eye-Based Human-Computer Interaction," in *Advances in Physiological Computing*, Springer-Verlag London, 2014, pp. 17-39.
Schowengerdt et al., "Stereoscopic retinal scanning laser display with integrated focus cues for ocular accommodation" *Proc. of SPIE-IS&T Electronic Imaging 5297*:366-376, 2004.
Silverman et al., "58.5L: Late-News Paper: Engineering a Retinal Scanning Laser Display with Integrated Accommodative Depth Cues," SID 03 Digest, pp. 1538-1541, 2003.
Takatsuka et al., "Retinal projection display using diffractive optical element," Tenth International Conference on Intelligent Information Hiding and Multimedia Signal Processing, IEEE, 2014, pp. 403-406.
Urey et al., "Optical performance requirements for MEMS-scanner based microdisplays," Conf. on MOEMS and Miniaturized Systems, *SPIE 4178*: 176-185, 2000.
Urey, "Diffractive exit-pupil expander for display applications," *Applied Optics 40*(32):5840-5851, 2001.
Viirre et al., "The Virtual Retinal Display: A New Technology for Virtual Reality and Augmented Vision in Medicine," *Proc. of Medicine Meets Virtual Reality*, IOS Press and Ohmsha, 1998, pp. 252-257. (6 pages).
International Search Report and Written Opinion dated Apr. 25, 2017 for corresponding International Application No. PCT/US2016/067246, 12 pages.

\* cited by examiner

SYSTEMS, DEVICES, AND METHODS FOR EYEBOX EXPANSION DISPLAYS IN WEARABLE HEADS-UP DISPLAYS

BACKGROUND

Technical Field

The present systems, devices, and methods generally relate to scanning laser-based display technologies and particularly relate to expanding the eyebox of a scanning laser-based wearable heads-up display.

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus while still providing displayed content with sufficient visual quality. There is a need in the art for wearable heads-up displays of more aesthetically-appealing design that are capable of providing high-quality images to the user without limiting the user's ability to see their external environment.

Eyebox

In near-eye optical devices such as rifle scopes and wearable heads-up displays, the range of eye positions (relative to the device itself) over which specific content/imagery provided by the device is visible to the user is generally referred to as the "eyebox." An application in which content/imagery is only visible from a single or small range of eye positions has a "small eyebox" and an application in which content/imagery is visible from a wider range of eye positions has a "large eyebox." The eyebox may be thought of as a volume in space positioned near the optical device. When the eye of the user (and more particularly, the pupil of the eye of the user) is positioned inside this volume and facing the device, the user is able to see all of the content/imagery provided by the device. When the eye of the user is positioned outside of this volume, the user is not able to see at least some of the content/imagery provided by the device.

The geometry (i.e., size and shape) of the eyebox is an important property that can greatly affect the user experience for a wearable heads-up display. For example, if the wearable heads-up display has a small eyebox that centers on the user's pupil when the user is gazing directly ahead, some or all content displayed by the wearable heads-up display may disappear for the user when the user gazes even slightly off-center, such as slightly to the left, slightly to the right, slightly up, or slightly down. Furthermore, if a wearable heads-up display that has a small eyebox is designed to align that eyebox on the pupil for some users, the eyebox will inevitably be misaligned relative to the pupil of other users because not all users have the same facial structure. Unless a wearable heads-up display is deliberately designed to provide a glanceable display (i.e., a display that is not always visible but rather is only visible when the user gazes in a certain direction), it is generally advantageous for a wearable heads-up display to have a large eyebox.

Demonstrated techniques for providing a wearable heads-up display with a large eyebox generally necessitate adding more bulky optical components to the display. Technologies that enable a wearable heads-up display of minimal bulk (relative to conventional eyeglass frames) to provide a large eyebox are generally lacking in the art.

BRIEF SUMMARY

A wearable heads-up display may be summarized as including: a support structure that in use is worn on a head of a user; a scanning laser projector carried by the support structure; a holographic combiner carried by the support structure, wherein the holographic combiner is positioned within a field of view of an eye of the user when the support structure is worn on the head of the user; and an exit pupil selector carried by the support structure and positioned in an optical path between the scanning laser projector and the holographic combiner, the exit pupil selector controllably switchable into and between respective ones of N different configurations, where N is an integer greater than 1, wherein in each one of the N different configurations the exit pupil selector is positioned and oriented to receive at least one light signal generated by the scanning laser projector and redirect the at least one light signal towards the holographic combiner effectively from a respective one of N spatially-separated virtual positions for the scanning laser projector, and wherein the holographic combiner comprises at least one hologram positioned and oriented to redirect light signals received from the exit pupil selector towards the eye of the user. The exit pupil selector may be controllably switchable into and between respective ones of the N different configurations by at least one form of movement selected from a group consisting of: a translation of at least one optical element of the exit pupil selector, a rotation of at least one optical element of the exit pupil selector, and a displacement of at least one optical element of the exit pupil selector. The exit pupil selector may include at least one dynamic optical element selected from a group consisting of: at least one microelectromechanical systems ("MEMS") based optical element and at least one piezo-based optical element.

The support structure may have a general shape and appearance of an eyeglasses frame. The wearable heads-up display may further include a prescription eyeglass lens. The holographic combiner may be carried by the prescription eyeglass lens.

For each one of the N different configurations of the exit pupil selector, the at least one hologram of the holographic combiner may converge light signals received from the exit pupil selector to a respective one of N exit pupils at or proximate the eye of the user. The holographic combiner may include at least N multiplexed holograms and, for each one of the N different configurations of the exit pupil selector, a respective one of the at least N multiplexed holograms may converge light signals received from the exit pupil selector to a respective one of the N exit pupils at or proximate the eye of the user. The scanning laser projector may include a red laser diode, a green laser diode, and a blue laser diode, and the holographic combiner may include a wavelength-multiplexed holographic combiner that includes at least one red hologram, at least one green hologram, and at least one blue hologram. In this case, for each one of the N different configurations of the exit pupil selector: the at least one red hologram may converge a red component of light signals received from the exit pupil selector to a respective one of the N exit pupils at or proximate the eye of the user, the at least one green hologram may converge a green component of light signals received from the exit pupil selector to a respective one of the N exit pupils at or proximate the eye of the user, and the at least one blue hologram may converge a blue component of light signals received from the exit pupil selector to a respective one of the N exit pupils at or proximate the eye of the user. The holographic combiner may further include a wavelength-multiplexed and angle-multiplexed holographic combiner that includes at least N angle-multiplexed red holograms, at least N angle-multiplexed green holograms, and at least N angle-multiplexed blue holograms. In this case, for each one of the N different configurations of the exit pupil selector: a respective one of the at least N angle-multiplexed red holograms may converge a red component of light signals received from the exit pupil selector to a respective one of the N exit pupils at or proximate the eye of the user, a respective one of the at least N angle-multiplexed green holograms may converge a green component of light signals received from the exit pupil selector to a respective one of the N exit pupils at or proximate the eye of the user, and a respective one of the at least N angle-multiplexed blue holograms may converge a blue component of light signals received from the exit pupil selector to a respective one of the N exit pupils at or proximate the eye of the user.

The optical path between the scanning laser projector and the holographic combiner may include a total scan range θ of the scanning laser projector. For each one of the N different configurations of the exit pupil selector, the exit pupil selector may be positioned and oriented to receive all light signals corresponding to a sweep of the total scan range θ by the scanning laser projector and redirect all light signals corresponding to the sweep of the total scan range θ of the scanning laser projector towards the holographic combiner effectively from a respective one of the N spatially-separated virtual positions for the scanning laser projector.

The at least one light signal may include an image comprising at least two pixels. In each one of the N different configurations the exit pupil selector may be positioned and oriented to receive a respective instance of the image generated by the scanning laser projector and redirect the respective instance of the image towards the holographic combiner effectively from a respective one of the N spatially-separated virtual positions for the scanning laser projector. At least one hologram of the holographic combiner may be positioned and oriented to redirect each instance of the image received from the exit pupil selector towards the eye of the user.

In each one of the N different configurations the exit pupil selector may be positioned and oriented to receive a respective instance of a same pixel in a different instance of a same image generated by the scanning laser projector and redirect the respective instance of the same pixel in the different instance of the same image towards the holographic combiner effectively from a respective one of the N spatially-separated virtual positions for the scanning laser projector. At least one hologram of the holographic combiner may be positioned and oriented to redirect each instance of the same pixel in the different instance of the same image received from the exit pupil selector towards the eye of the user.

The wearable heads-up display may further include an eye tracker carried by the support structure, positioned and oriented to determine a gaze direction of the eye of the user, wherein the exit pupil selector is controllably switchable into and between respective ones of the N different configurations based on the gaze direction of the eye of the user determined by the eye tracker.

A wearable heads-up display may be summarized as including: a support structure that in use is worn on a head of a user; a scanning laser projector carried by the support structure; a holographic combiner carried by the support structure, wherein the holographic combiner is positioned within a field of view of an eye of the user when the support structure is worn on the head of the user; and an exit pupil selector carried by the support structure and positioned in an optical path between the scanning laser projector and the holographic combiner, the exit pupil selector controllably switchable into and between respective ones of N different configurations, where N is an integer greater than 1, wherein in each one of the N different configurations the exit pupil selector is positioned and oriented to receive at least one light signal generated by the scanning laser projector and redirect the at least one light signal towards the holographic combiner along a respective optical path between the exit pupil selector and the holographic combiner, and wherein the holographic combiner comprises at least one hologram positioned and oriented to redirect light signals received from the exit pupil selector towards the eye of the user. For each one of the N different configurations of the exit pupil selector, the at least one hologram of the holographic combiner may converge light signals received from the exit pupil selector to a respective one of N exit pupils at or proximate the eye of the user.

A method of operating a wearable heads-up display, the wearable heads-up display including a scanning laser projector, a controllably switchable exit pupil selector, and a holographic combiner positioned within a field of view of an eye of a user when the wearable heads-up display is worn on a head of the user, may be summarized as including: generating a first sequence of N instances of a light signal by the scanning laser projector, where N is an integer greater than 1; controllably switching the exit pupil selector into and between a first sequence of N different configurations; receiving respective ones of the N instances of the light signal by the exit pupil selector in respective ones of the N different configurations; redirecting each one of the N instances of the light signal towards the holographic combiner along a respective optical path by the exit pupil selector in respective ones of the N different configurations; and redirecting respective ones of the N instances of the light signal towards the eye of the user by the holographic combiner. Controllably switching the exit pupil selector into and between a first sequence of N different configurations may include controllably switching the exit pupil selector into and between respective ones of the N different configurations by at least one form of movement selected from a group consisting of: translating at least one optical element of the exit pupil selector, rotating at least one optical element of the exit pupil selector, and displacing at least one optical element of the exit pupil selector. Redirecting respective ones of the N instances of the light signal towards the eye of the user by the holographic combiner may include redirecting respective ones of the N instances of the light signal spatially in parallel with one another towards N respective regions of the eye of the user by the holographic combiner.

Redirecting respective ones of the N instances of the light signal towards the eye of the user by the holographic combiner may include converging respective ones of the N instances of the light signal to respective ones of N exit pupils at or proximate the eye of the user by the holographic combiner. The holographic combiner may include at least N multiplexed holograms, and converging respective ones of the N instances of the light signal to respective ones of N exit pupils at or proximate the eye of the user by the holographic combiner may include converging each one of the N instances of the light signal to a respective one of the N exit pupils at or proximate the eye of the user by a respective one of the at least N multiplexed holograms. The scanning laser projector may include a red laser diode, a green laser diode, and a blue laser diode, the N instances of the light signal generated by the scanning laser projector each may include a respective red component, a respective green component, and a respective blue component; and the holographic combiner may include a wavelength-multiplexed holographic combiner that includes at least one red hologram, at least one green hologram, and at least one blue hologram. In this case, converging each one of the N instances of the light signal to a respective one of the N exit pupils at or proximate the eye of the user by a respective one of the at least N multiplexed holograms may include: converging a respective red component of each one of the N instances of the light signal to a respective one of the N exit pupils at or proximate the eye of the user by the at least one red hologram; converging a respective green component of each one of the N instances of the light signal to a respective one of the N exit pupils at or proximate the eye of the user by the at least one green hologram; and converging a respective blue component of each one of the N instances of the light signal to a respective one of the N exit pupils at or proximate the eye of the user by the at least one blue hologram. The holographic combiner may include a wavelength-multiplexed and angle-multiplexed holographic combiner that includes at least N angle-multiplexed red holograms, at least N angle-multiplexed green holograms, and at least N angle-multiplexed blue holograms. In this case: converging a respective red component of each one of the N instances of the light signal to a respective one of the N exit pupils at or proximate the eye of the user by the at least one red hologram may include converging a respective red component of each one of the N instances of the light signal to a respective one of the N exit pupils at or proximate the eye of the user by a respective one of the at least N angle-multiplexed red holograms; converging a respective green component of each one of the N instances of the light signal to a respective one of the N exit pupils at or proximate the eye of the user by the at least one green hologram may include converging a respective green component of each one of the N instances of the light signal to a respective one of the N exit pupils at or proximate the eye of the user by a respective one of the at least N angle-multiplexed green holograms; and converging a respective blue component of each one of the N instances of the light signal to a respective one of the N exit pupils at or proximate the eye of the user by the at least one blue hologram may include converging a respective blue component of each one of the N instances of the light signal to a respective one of the N exit pupils at or proximate the eye of the user by a respective one of the at least N angle-multiplexed blue holograms.

The method may further include: generating at least a second sequence of N instances of a light signal by the scanning laser projector; controllably switching the exit pupil selector into and between at least a second sequence of the N different configurations; receiving respective ones of the at least a second sequence of N instances of the light signal by the exit pupil selector in respective ones of the N different configurations; redirecting each light signal in the at least a second sequence of N instances of the light signal towards the holographic combiner along a respective optical path by the exit pupil selector in respective ones of the N different configurations; and redirecting respective ones of the at least a second sequence of N instances of the light signal towards the eye of the user by the holographic combiner.

The wearable heads-up display may further include an eye tracker and the method may further include: determining a gaze direction of the eye of the user by the eye tracker; controllably switching the exit pupil selector into a particular one of the N different configurations based on the gaze direction of the eye of the user determined by the eye tracker; and redirecting at least one of the N instances of the light signal towards a region of the eye of the user that contains a pupil of the eye of the user by the holographic combiner.

Generating a first sequence of N instances of a light signal by the scanning laser projector may include generating a first sequence of N light signals that each correspond to a respective instance of a same pixel in a different instance of a same image by the scanning laser projector. Alternatively, generating a first sequence of N instances of a light signal by the scanning laser projector may include generating a first sequence of N instances of a same image by the scanning laser projector.

Redirecting each one of the N instances of the light signal towards the holographic combiner along a respective optical path by the exit pupil selector in respective ones of the N different configurations may include redirecting respective ones of the N instances of the light signal towards the holographic combiner effectively from respective ones of N spatially-separated virtual positions for the scanning laser projector by the exit pupil selector in respective ones of the N different configurations.

A method of operating a wearable heads-up display, the wearable heads-up display including a scanning laser projector, a controllably switchable exit pupil selector, and a holographic combiner positioned within a field of view of an eye of a user when the wearable heads-up display is worn on a head of the user, may be summarized as including: generating a first light signal by the scanning laser projector; controllably switching the exit pupil selector into a first configuration; receiving the first light signal by the exit pupil selector in the first configuration; redirecting the first light signal towards the holographic combiner effectively from a first virtual position for the scanning laser projector by the exit pupil selector in the first configuration; and redirecting the first light signal towards a first exit pupil at the eye of the user by the holographic combiner. The method may further include: generating a second light signal by the scanning laser projector; controllably switching the exit pupil selector into a second configuration; receiving the second light signal by the exit pupil selector in the second configuration; redirecting the second light signal towards the holographic combiner effectively from a second virtual position for the scanning laser projector by the exit pupil selector in the second configuration, the second virtual position spatially-separated from the first virtual position; and redirecting the second light signal towards a second exit pupil at the eye of the user by the holographic combiner, the second exit pupil spatially-separated from the first exit pupil. Generating a first light signal by the scanning laser projector may include generating a first instance of a light signal by the scanning laser projector and generating a second light signal by the scanning laser projector may include generating a second instance of the light signal by the scanning laser projector.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
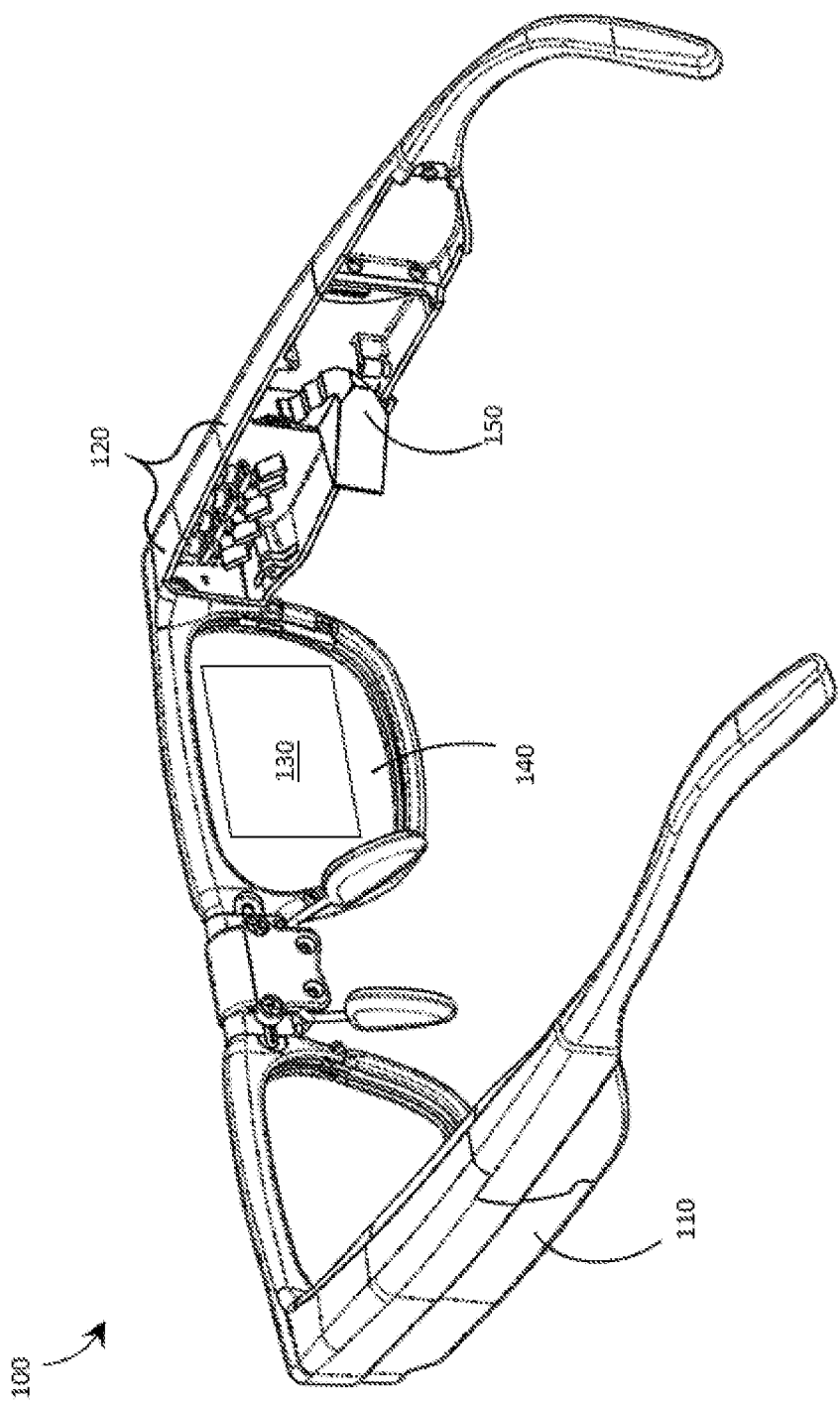
FIG. 1 is a partial-cutaway perspective view of a wearable heads-up display that provides a large eyebox made up of multiple optically-replicated exit pupils in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for eyebox expansion in scanning laser-based wearable heads-up displays ("WHUDs").

Generally, a scanning laser-based WHUD is a form of virtual retina display in which a scanning laser projector ("SLP") draws a raster scan onto the eye of the user. In the absence of any further measure the SLP projects light over a fixed area called the exit pupil of the display. In order for the user to see displayed content the exit pupil typically needs to align with, be encompassed by, or overlap with the entrance pupil of the user's eye. The full scan range of the SLP (i.e., the full resolution and/or field of view of the display) is visible to the user when the exit pupil of the display is completely contained within the entrance pupil of the eye. For this reason, a scanning laser-based WHUD typically employs a relatively small exit pupil that is equal to or smaller than the expected size of the entrance pupil of the user's eye (e.g., less than or equal to about 4 mm in diameter).

The eyebox of a scanning laser-based WHUD is defined by the geometry of the exit pupil of the display at or proximate the eye of the user. A scanning laser-based WHUD that employs a small exit pupil in order to achieve maximum display resolution and/or field of view typically has the drawback of having a relatively small eyebox. For example, the exit pupil may be aligned with the center of the user's eye so that the eye's pupil is located "within the eyebox" when the user is gazing directly ahead, but the eye's pupil may quickly leave the eyebox if and when the user glances anywhere off-center. A larger eyebox may be achieved by increasing the size of the exit pupil but this typically comes at the cost of reducing the display resolution and/or field of view. In accordance with the present systems, devices, and methods, the eyebox of a scanning laser-based WHUD may be expanded by optically replicating or repeating a relatively small exit pupil and spatially distributing multiple copies or instances of the exit pupil over a relatively larger area of the user's eye, compared to the area of the single exit pupil on its own. In this way, at least one complete instance of the display exit pupil (either as a single instance in its entirety or as a combination of respective portions of multiple instances) may be contained within the perimeter of the eye's pupil for each of a range of eye positions corresponding to a range of gaze directions of the user. In other words, the present systems, devices, and methods describe eyebox expansion by exit pupil replication in scanning laser-based WHUDs.

Throughout this specification and the appended claims, the term "replication" is used (e.g., in the context of "exit pupil replication") to generally refer to situations where multiple instances of substantially the same thing (e.g., an exit pupil) are produced. The term "exit pupil replication" is intended to generally encompass approaches that produce concurrent (e.g., temporally parallel) instances of an exit pupil as well as approaches that produce sequential (e.g., temporally serial or "repeated") instances of an exit pupil. In many examples, the present systems, devices, and methods provide exit pupil replication by exit pupil repetition. Unless the specific context requires otherwise, references to "exit pupil replication" herein include exit pupil replication by exit pupil repetition.

FIG. 1 is a partial-cutaway perspective view of a WHUD 100 that provides a large eyebox made up of multiple optically-replicated exit pupils in accordance with the present systems, devices, and methods. WHUD 100 includes a support structure 110 that in use is worn on the head of a user and has a general shape and appearance of an eyeglasses (e.g., sunglasses) frame. Support structure 110 carries multiple components, including: a SLP 120, a holographic combiner 130, and an exit pupil selector 150. Portions of SLP 120 and exit pupil selector 150 may be contained within an inner volume of support structure 110; however, FIG. 1 provides a partial-cutaway view in which regions of support structure 110 have been removed in order to render visible portions of SLP 120 and exit pupil selector 150 that may otherwise be concealed.

Throughout this specification and the appended claims, the term "carries" and variants such as "carried by" are generally used to refer to a physical coupling between two objects. The physical coupling may be direct physical coupling (i.e., with direct physical contact between the two objects) or indirect physical coupling that may be mediated by one or more additional objects. Thus, the term carries and variants such as "carried by" are meant to generally encompass all manner of direct and indirect physical coupling, including without limitation: carried on, carried within, physically coupled to, and/or supported by, with or without any number of intermediary physical objects therebetween.

SLP 120 may include multiple laser diodes (e.g., a red laser diode, a green laser diode, and/or a blue laser diode) and at least one scan mirror (e.g., a single two-dimensional scan mirror or two one-dimensional scan mirrors, which may be, e.g., MEMS-based or piezo-based). SLP 120 may be communicatively coupled to (and support structure 110 may further carry) a processor and a non-transitory processor-readable storage medium or memory storing processor-executable data and/or instructions that, when executed by the processor, cause the processor to control the operation of SLP 120. For ease of illustration, FIG. 1 does not call out a processor or a memory.

Holographic combiner 130 is positioned within a field of view of at least one eye of the user when support structure 110 is worn on the head of the user. Holographic combiner 130 is sufficiently optically transparent to permit light from the user's environment (i.e., "environmental light") to pass through to the user's eye. In the illustrated example of FIG. 1, support structure 110 further carries a transparent eyeglass lens 140 (e.g., a prescription eyeglass lens) and holographic combiner 130 comprises at least one layer of holographic material that is adhered to, affixed to, laminated with, carried in or upon, or otherwise integrated with eyeglass lens 140. The at least one layer of holographic material may include a photopolymer film such as Bayfol®HX available from Bayer MaterialScience AG or a silver halide compound and may, for example, be integrated with transparent lens 140 using any of the techniques described in U.S. Provisional Patent Application Ser. No. 62/214,600. Holographic combiner 130 includes at least one hologram in or on the at least one layer of holographic material. With holographic combiner 130 positioned in a field of view of an eye of the user when support structure 110 is worn on the head of the user, the at least one hologram of holographic combiner 130 is positioned and oriented to redirect light originating from SLP 120 towards the eye of the user. In particular, the at least one hologram is positioned and oriented to receive light signals that originate from SLP 120 and converge those light signals to at least one exit pupil at or proximate the eye of the user.

Exit pupil selector 150 is positioned in an optical path between SLP 120 and holographic combiner 130. Exit pupil selector 150 is controllably switchable (e.g., at least one optical element of exit pupil selector 150 is controllably switchable) into and between multiple (e.g., N, where N is an integer greater than 1) different states or "configurations." In each one of the N different configurations, exit pupil selector 150 (e.g., at least one optical element of exit pupil selector 150) is positioned and oriented to receive at least one light signal generated by SLP 120 and redirect the at least one light signal towards holographic combiner 130 along a respective optical path between exit pupil selector 150 and holographic combiner 130. Advantageously, exit pupil selector 150 may be or comprise at least one dynamic optical element that, in each one of the N different configurations, is positioned and oriented to redirect at least one light signal from SLP 120 towards holographic combiner 130 effectively from a respective one of N different spatially-separated "virtual positions" for SLP 120 as opposed to from the real position for SLP 120. The at least one dynamic optical element may include any one or combination, configuration, and/or arrangement of at least one microelectromechanical system (MEMS) based and/or piezo-based: lens, reflector, partial reflector, prism, diffractor, diffraction grating, mirror, or other optical element. Generally, exit pupil selector 150 may be controllably switchable (e.g., at least one dynamic optical element of exit pupil selector 150 may be controllably switchable) into and between respective ones of the N different configurations by at least one form of movement, such as: a translation of at least one dynamic optical element, a rotation of at least one dynamic optical element, and/or a displacement of at least one dynamic optical element.

Throughout this specification and the appended claims, reference is often made to one or more "virtual position(s)" such as "N spatially-separated virtual positions for a SLP." The "real position" of an object is its actual position in real, three dimensional space. A "virtual position" of an object is a position in real space at which the optics of a system cause light from the object to effectively originate even though the real position of the object may be elsewhere. In other words, the optics of the system cause light from the object to follow optical paths that would trace back, if the optics of the system were ignored during the trace back, to a "virtual position" in space that is spatially-separated from the object's "real position" in space. As a simple example, an object in front of a planar mirror has a "virtual position" on the other side of the planar mirror. A "virtual position" may be a result of one or more intervening optical element(s) in an optical path. When one or more optical element(s) redirects light signals from a SLP, a virtual position for the SLP refers to the position in real space at which the SLP would need to be located in order to provide light signals having that same trajectory without any intervening optics. The optics of the system cause the light signals to follow a trajectory that would correspond to a different point of origin if there were no such optics in the system. The light signals appear to have "effectively" originated from a different, or "virtual," position for the SLP.

Figure 2A:
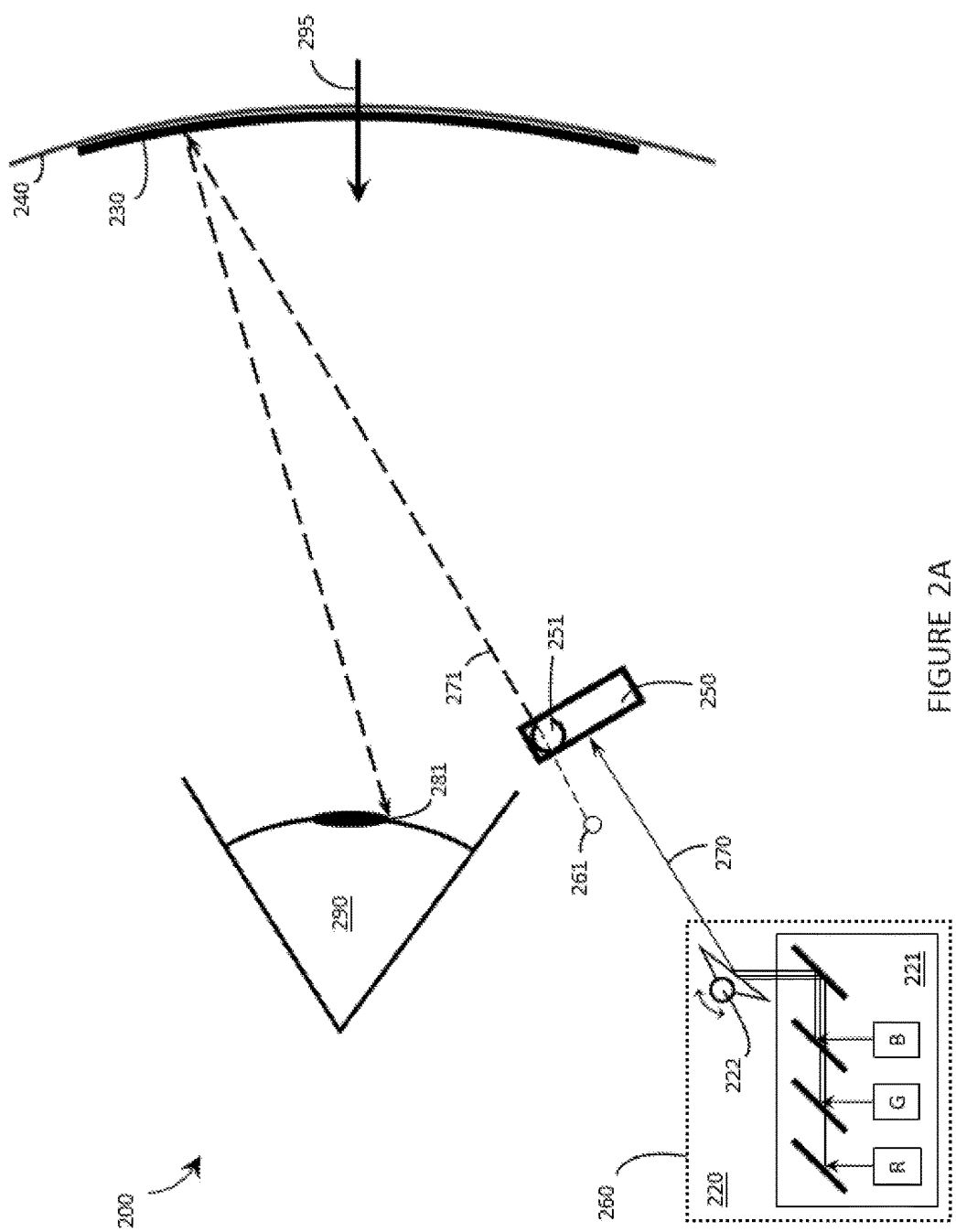
FIG. 2A is an illustrative diagram of a wearable heads-up display showing an exit pupil selector in operation for the purpose of eyebox expansion by exit pupil replication in accordance with the present systems, devices, and methods, the wearable heads-up display with the exit pupil selector controllably switched into a first configuration to replicate (e.g., provide a first instance of) a first exit pupil.

FIG. 2A is an illustrative diagram of a WHUD 200 showing an exit pupil selector 250 in operation for the purpose of eyebox expansion by exit pupil replication in accordance with the present systems, devices, and methods. WHUD 200 may be substantially similar to WHUD 100 from FIG. 1, although in FIG. 2A no support structure (e.g., support structure 110) is illustrated in order to reduce clutter. As with WHUD 100, WHUD 200 comprises a SLP 220 (which includes a RGB laser module 221 and at least one MEMS-based scan mirror 222), a holographic combiner 230 carried by an eyeglass lens 240, and the exit pupil selector 250. As previously described, the combination of holographic combiner 230 and eyeglass lens 240 is sufficiently transparent to allow environmental light 295 to pass through to the eye 290 of the user.

SLP 220 is located at a position 260 (i.e., a "real" position) relative to holographic combiner 230 and is shown generating (e.g., projecting) a first light signal 270. Exit pupil selector 250 is positioned in an optical path between SLP 220 and holographic combiner 230 such that exit pupil selector 250 interrupts (e.g., receives) first light signal 270 en route from SLP 220 to holographic combiner 230. As previously described, exit pupil selector 250 includes at least one dynamic optical element (e.g., at least one MEMS-based and/or piezo-based lens, reflector, partial reflector, prism, diffractor, diffraction grating, mirror, or other optical element, or at least one combination or arrangement of such) that is controllably switchable into and between respective ones of N different states or "configurations." In each one of the N different configurations exit pupil selector 250 (e.g., at least one dynamic optical element thereof) is positioned and oriented to redirect at least one light signal 270 from SLP 220 towards holographic combiner 230 effectively from a respective one of N different spatially-separated virtual positions for SLP 220. In the illustrated example of FIG. 2A, exit pupil selector 250 (e.g., at least one dynamic optical element thereof) is controllable switched into a first configuration 251 (e.g., a first one of N configurations) in which exit pupil selector 250 (e.g., at least one dynamic optical element thereof) is positioned and oriented to receive first light signal 270 from real position 260 for SLP 220 and redirect first light signal 270 towards holographic combiner 230 effectively from a first virtual position 261 for SLP 220. First virtual position 261 for SLP 220 is spatially-separated from real position 260 for SLP 220, so the optical paths between first virtual position 261 for SLP 220 and holographic combiner 230 are different from the optical paths between real position 260 for SLP 220 and holographic combiner 230. In first configuration 251 exit pupil selector 250 redirects first light signal 270 along a first optical path 271 (represented by lines with large dashes in FIG. 2A) between first virtual position 261 for SLP 220 and holographic combiner 230 and first optical path 271 is different from the original optical path of first light signal 270 between real position 260 for SLP 220 and holographic combiner 230.

Figure 2B:
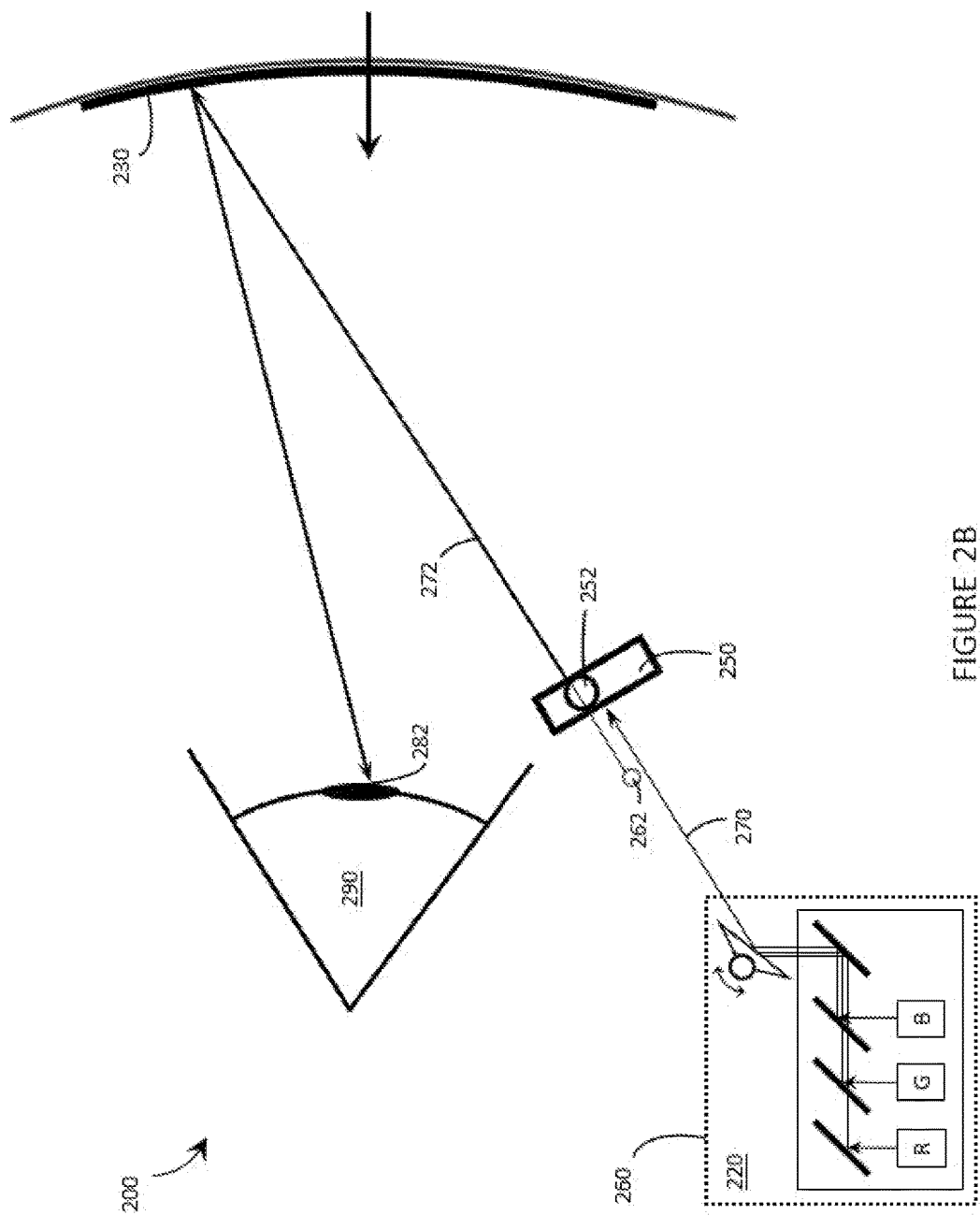
FIG. 2B is an illustrative diagram of the wearable heads-up display from FIG. 2A with the exit pupil selector controllably switched into a second configuration to replicate (e.g., provide a second instance of) the first exit pupil from FIG. 2A as a second exit pupil, with the second exit pupil spatially separated from the first exit pupil in accordance with the present systems, devices, and methods.
Figure 2C:
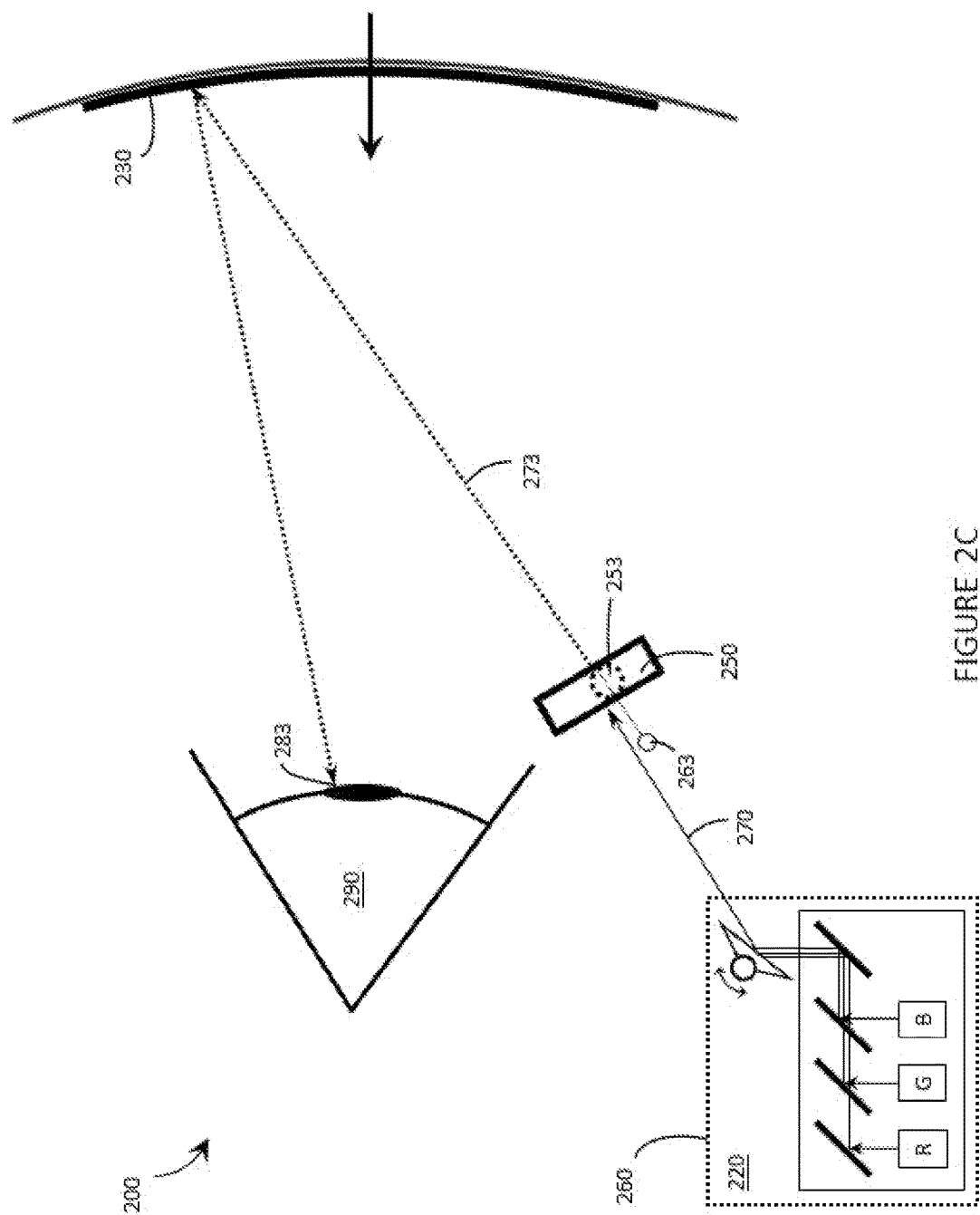
FIG. 2C is an illustrative diagram of the wearable heads-up display from FIGS. 2A and 2B with the exit pupil selector controllably switched into a third configuration to replicate (e.g., provide a third instance of) the first exit pupil from FIG. 2A and the second exit pupil from FIG. 2B as a third exit pupil, with the third exit pupil spatially separated from both the second exit pupil and the first exit pupil in accordance with the present systems, devices, and methods.
Figure 2D:
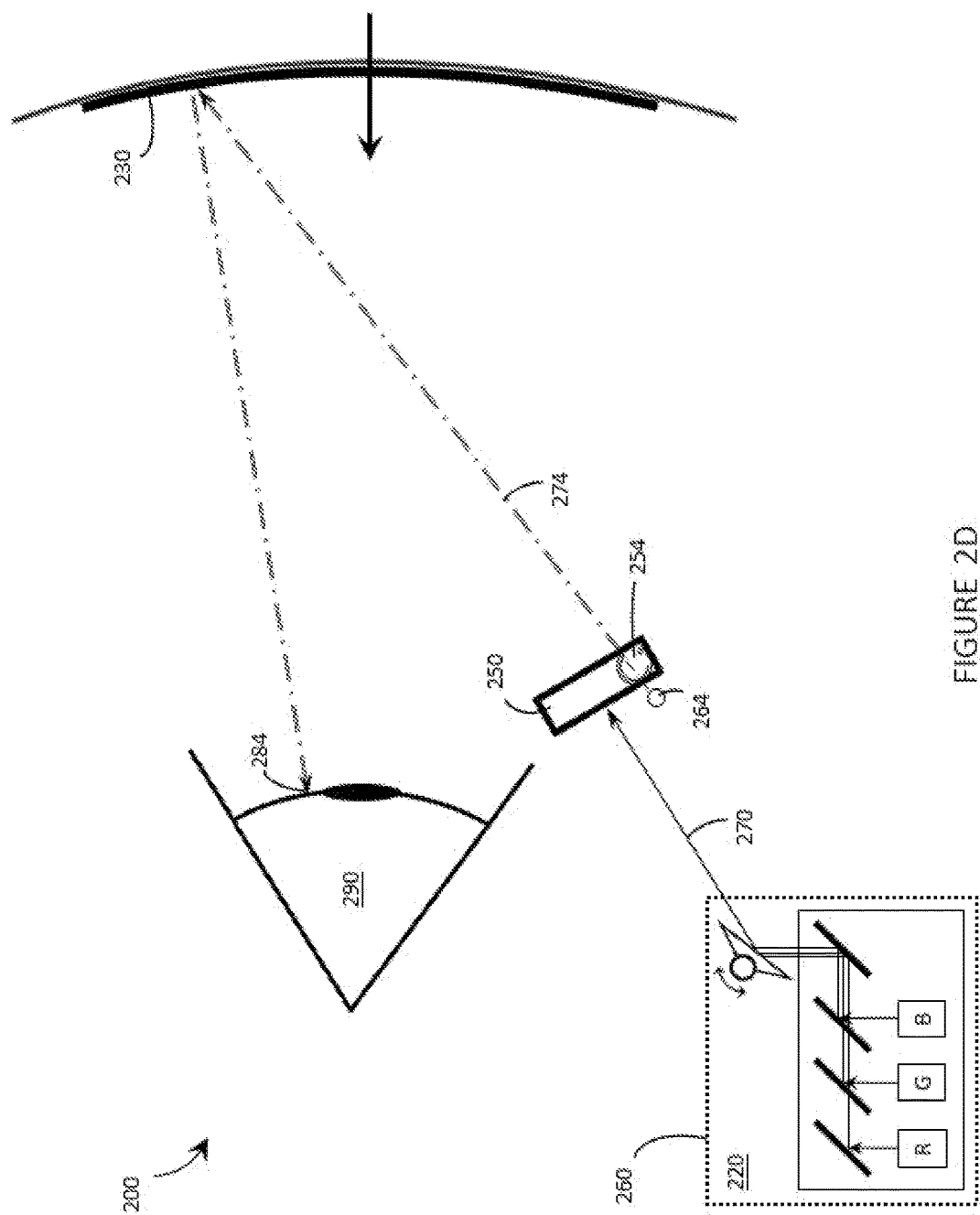
FIG. 2D is an illustrative diagram of the wearable heads-up display from FIGS. 2A, 2B, and 2C with the exit pupil selector controllably switched into a fourth configuration to replicate (e.g., provide a fourth instance of) the first exit pupil from FIG. 2A, the second exit pupil from FIG. 2B, and the third exit pupil from FIG. 2C as a fourth exit pupil, with the fourth exit pupil spatially separated from each of the first exit pupil, the second exit pupil, and the third exit pupil in accordance with the present systems, devices, and methods.

As previously described, holographic combiner 230 includes at least one hologram that is operative (e.g., designed, crafted, encoded, recorded, and/or generally positioned and oriented) to redirect light signals 270 received from exit pupil selector 250 towards the eye 290 of the user. For each one of the N different configurations of exit pupil selector 250, the at least one hologram of holographic combiner 230 may converge light signals 270 received from exit pupil selector 250 to a respective one of N exit pupils at or proximate eye 290. In this way, exit pupil selector 250 effectively selects the exit pupil to which first light signal 270 will be converged by holographic combiner 230. In the illustrated example of FIG. 2A, exit pupil selector 250 is in a first configuration 251 in which at least one hologram of holographic combiner 230 receives first light signal 270 redirected along first optical path 271 from exit pupil selector 250 and converges first light signal 270 to a first exit pupil 281 at eye 290. Three additional configurations of controllably switchable exit pupil selector 250 are illustrated in FIGS. 2B, 2C, and 2D, each of which results in holographic combiner 230 converging light signals 270 to a respective one of three different exit pupils at eye 290. A person of skill in the art will appreciate that exit pupil selector 250 may controllably switch between (e.g., transition between) respective ones of the N different configurations even though such transitions are not illustrated.

FIG. 2B is an illustrative diagram of WHUD 200 from FIG. 2A with exit pupil selector 250 controllably switched into a second configuration 252 to replicate (e.g., provide a second instance of) first exit pupil 281 from FIG. 2A as a second exit pupil 282, with second exit pupil 282 spatially separated from first exit pupil 281 in accordance with the present systems, devices, and methods. In second configuration 252, exit pupil selector 250 (e.g., at least one dynamic optical element thereof) is positioned and oriented to receive first light signal 270 from SLP 220 located at real position 260 and redirect first light signal 270 towards holographic combiner 230 effectively from a second virtual position 262 for SLP 220. Second virtual position 262 for SLP 220 is spatially-separated from real position 260 for SLP 220, so the optical path between second virtual position 262 for SLP 220 and holographic combiner 230 is different from the optical path between real position 260 for SLP 220 and holographic combiner 230. In second configuration 252 exit pupil selector 250 redirects first light signal 270 along a second optical path 272 (represented by solid lines in FIG. 2B) between second virtual position 262 for SLP 220 and holographic combiner 230 and second optical path 272 is different from first optical path 271 from FIG. 2A. Holographic combiner 230 receives first light signal 270 redirected along second optical path 272 from exit pupil selector 250 and converges first light signal 270 to second exit pupil 282 at eye 290. Second exit pupil 282 is spatially separated from first exit pupil 281.

First exit pupil 281 receives a first instance of first light signal 270 along first optical path 271 redirected from exit pupil selector 250 in its first configuration 251 (per FIG. 2A) and second exit pupil 282 receives a second instance of first light signal 270 along second optical path 272 redirected from exit pupil selector 250 in its second configuration 252 (per FIG. 2B). In other words, first light signal 270 is effectively replicated over two exit pupils 281 and 282 which are controllably selected by exit pupil selector 250. In some implementations, SLP 220 may generate a single instance of first light signal 270 and exit pupil selector 250 may controllably switch into and between first configuration 251 and second configuration 252 within the projection duration of first light signal 270 (e.g., within the amount of time that SLP 220 continues to output light signal 270, which begins when SLP 220 first begins to emit light signal 270 and ends when SLP 220 first ceases to emit light signal 270). In other words, SLP 220 may generate a single continuous instance of first light signal 270 while exit pupil selector 250 is controllably switched into and between respective ones of the N different configurations. In other implementations, SLP 220 may generate a first instance of first light signal 270 while exit pupil selector 250 is controllably switched into first configuration 251, SLP 220 may not generate any light signals while exit pupil selector 250 is controllably switched between first configuration 251 and second configuration 252, and SLP 220 may generate a second instance of first light signal 270 while exit pupil selector 250 is controllably switched into second configuration 252. In other words, SLP 220 may generate a first sequence of first light signals 270 such that SLP 220 is actively generating (e.g., is modulated on) a respective instance of first light signal 270 while exit pupil selector 250 is in each one of the N different configurations and SLP 220 is not generating (e.g., is modulated off) any light signals while exit pupil selector 250 is controllably switched between (e.g., transitioning between) respective ones of the N configurations.

FIG. 2C is an illustrative diagram of WHUD 200 from FIGS. 2A and 2B with exit pupil selector 250 controllably switched into a third configuration 253 to replicate (e.g., provide a third instance of) first exit pupil 281 from FIG. 2A and second exit pupil 282 from FIG. 2B as a third exit pupil 283, with third exit pupil 283 spatially separated from both second exit pupil 282 and first exit pupil 281 in accordance with the present systems, devices, and methods. In third configuration 253, exit pupil selector 250 (e.g., at least one dynamic optical element thereof) is positioned and oriented to receive first light signal 270 from SLP 220 located at real position 260 and redirect first light signal 270 towards holographic combiner 230 effectively from a third virtual position 263 for SLP 220. Third virtual position 263 for SLP 220 is spatially-separated from real position 260 for SLP 220, so the optical path between third virtual position 263 for SLP 220 and holographic combiner 230 is different from the optical path between real position 260 for SLP 220 and holographic combiner 230. In third configuration 253 exit pupil selector 250 redirects first light signal 270 along a third optical path 273 (represented by dotted lines in FIG. 2C) between third virtual position 263 for SLP 220 and holographic combiner 230 and this third optical path 273 is different from both first optical path 271 from FIG. 2A and second optical path 272 from FIG. 2B. Holographic combiner 230 receives first light signal 270 redirected along third optical path 273 from exit pupil selector 250 and converges first light signal 270 to third exit pupil 283 at eye 290. Third exit pupil 283 is spatially separated from both first exit pupil 281 and second exit pupil 282.

Third exit pupil 283 receives a third instance of first light signal 270 along third optical path 273 redirected from exit pupil selector 250 in its third configuration 253. Because exit pupils 281, 282, and 283 may all receive respective instances of the same first light signal 270, exit pupils 281, 282, and 283 may be viewed as replicated instances of the same exit pupil.

FIG. 2D is an illustrative diagram of WHUD 200 from FIGS. 2A, 2B, and 2C with exit pupil selector 250 controllably switched into a fourth configuration 254 to replicate (e.g., provide a fourth instance of) first exit pupil 281 from FIG. 2A, second exit pupil 282 from FIG. 2B, and third exit pupil 283 from FIG. 2C as a fourth exit pupil 284, with fourth exit pupil 284 spatially separated from each of first exit pupil 281, second exit pupil 282, and third exit pupil 283 in accordance with the present systems, devices, and methods. In fourth configuration 254, exit pupil selector 250 (e.g., at least one dynamic optical element thereof) is positioned and oriented to receive first light signal 270 from SLP 220 located at real position 260 and redirect first light signal 270 towards holographic combiner 230 effectively from a fourth virtual position 264 for SLP 220. Fourth virtual position 264 for SLP 220 is spatially-separated from real position 260 for SLP 220, so the optical path between fourth virtual position 264 for SLP 220 and holographic combiner 230 is different from the optical path between real position 260 for SLP 220 and holographic combiner 230. In fourth configuration 254 exit pupil selector 250 redirects first light signal 270 along a fourth optical path 274 (represented by lines with alternating large and short dashes in FIG. 2D) between fourth virtual position 264 for SLP 220 and holographic combiner 230 and fourth optical path 274 is different from each of first optical path 271 from FIG. 2A, second optical path 272 from FIG. 2B, and third optical path 273 from FIG. 2C. Holographic combiner 230 receives first light signal 270 redirected along fourth optical path 274 from exit pupil selector 250 and converges first light signal 270 to fourth exit pupil 284 at eye 290. Fourth exit pupil 284 is spatially separated from all of first exit pupil 281, second exit pupil 282, and third exit pupil 283.

Fourth exit pupil 284 receives a fourth instance of first light signal 270 along fourth optical path 274 redirected from exit pupil selector 250 in its fourth configuration 254. Because exit pupils 281, 282, 283, and 284 may all receive respective instances of the same first light signal 270, exit pupils 281, 282, 283, and 284 may be viewed as replicated instances of the same exit pupil.

Figure 2E:
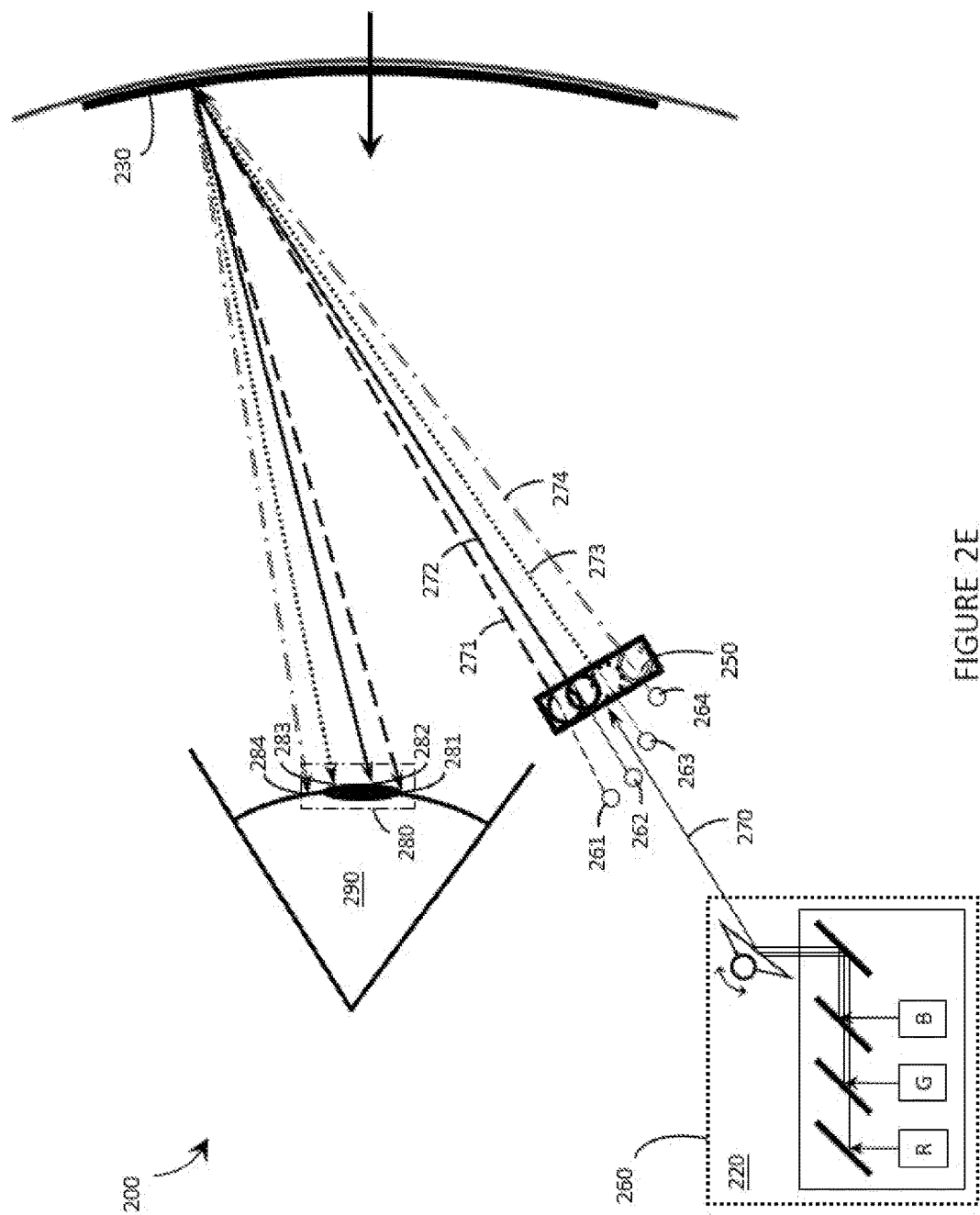
FIG. 2E is an illustrative diagram of the wearable heads-up display from FIGS. 2A, 2B, 2C, and 2D showing an example of eyebox expansion by exit pupil replication in accordance with the present systems, devices, and methods.

FIG. 2E is an illustrative diagram of WHUD 200 from FIGS. 2A, 2B, 2C, and 2D showing an example of eyebox expansion by exit pupil replication in accordance with the present systems, devices, and methods. FIG. 2E depicts the cumulative effect of exit pupil selector 250 controllably switched into and between the four configurations 251, 252, 253, and 254 of FIGS. 2A, 2B, 2C, and 2D, respectively, to produce four replicated exit pupils 281, 282, 283, and 284 at eye 290. In other words, FIG. 2E simultaneously depicts each one of the four instants in time shown in FIGS. 2A, 2B, 2C, and 2D all overlaid into one illustration. In practice, SLP 220 and exit pupil selector 250 may be synchronized and each actuated (i.e., modulated and controllably switched, respectively) at a rate that is too fast to be discerned by eye 290; thus, the cumulative effect (i.e., the concurrence of exit pupils 281, 282, 283, and 284) depicted in FIG. 2E may represent what is actually perceived by the user when exit pupil selector 250 controllably switches into and between the four configurations 251, 252, 253, and 254 illustrated in FIGS. 2A, 2B, 2C, and 2D, respectively sufficiently quickly (e.g., at about 60 Hz).

FIG. 2E shows the eyebox 280 of WHUD 200. Eyebox 280 represents the range of pupil positions (or gaze directions) for eye 290 for which at least one of exit pupils 281, 282, 283, and/or 284 aligns with or is incident on the pupil of eye 290. Each of exit pupils 281, 282, 283, and 284 converges to a respective spatially-separated region of eye 290 and eyebox 280 includes the combined area of those spatially-separated regions. Thus, the size of eyebox 280 is expanded relative to the size of any single one of exit pupils 281, 282, 283, and/or 284 on its own. A review of the construction of expanded eyebox 280 with reference to FIG. 2E is now provided.

SLP 220 is positioned at real position 260 in real space relative to holographic combiner 230. Exit pupil selector 250 (e.g., at least one optical element thereof) is controllably switchable into and between respective ones of N different configurations, where N is an integer greater than 1. In the illustrated example N=4 but a person of skill in the art will appreciate that 4 configurations for exit pupil selector 250 is used as an example for illustrative purposes only and in practice any number N>1 of configurations may be implemented. In each one of the N=4 different configurations exit pupil selector 250 (e.g., at least one dynamic optical element thereof) is positioned and oriented to receive at least one light signal 270 generated by SLP 220 and redirect the at least one light signal 270 towards holographic combiner 230 along a respective optical path 271, 272, 273, and 274 between exit pupil selector 250 and holographic combiner 230. Each one of the N=4 configurations of exit pupil selector 250 corresponds to a respective one of N=4 spatially-separated virtual positions 261, 262, 263, and 264 for SLP 220. In other words, each one of the N=4 optical paths 271, 272, 273, and 274 traces back to a respective one of the N=4 spatially-separated virtual positions 261, 262, 263, and 264 for SLP 220. Specifically, first configuration 251 of exit pupil selector 250 redirects (e.g., is positioned and oriented to redirect) a first instance of light signal 270 towards holographic combiner 230 along first optical path 271 effectively from first virtual position 261 for SLP 220, second configuration 252 of exit pupil selector 250 redirects (e.g., is positioned and oriented to redirect) a second instance of light signal 270 towards holographic combiner 230 along second optical path 272 effectively from second virtual position 262 for SLP 220, third configuration 253 of exit pupil selector 250 redirects (e.g., is positioned and oriented to redirect) a third instance of light signal 270 towards holographic combiner 230 along third optical path 273 effectively from third virtual position 263 for SLP 220, and fourth configuration 254 of exit pupil selector 250 redirects (e.g., is positioned and oriented to redirect) a fourth instance of light signal 270 towards holographic combiner 230 along fourth optical path 274 effectively from fourth virtual position 264 for SLP 220. Each respective one of the N=4 virtual positions 261, 262, 263, and 264 for SLP 220 effectively established by exit pupil selector 250 is spatially-separated from the other ones of the N=4 virtual positions 261, 262, 263, and 264 for SLP 220 so that each respective optical path 271, 272, 273, and 274 for light signal 270 effectively impinges on holographic combiner 230 from a different position or location in space. Advantageously, each of the N=4 virtual positions 261, 262, 263, and 264 for SLP 220 may correspond to a respective position and orientation of SLP 220. In other words, relative to the other ones of the N=4 virtual positions 261, 262, 263, and 264 for SLP 220, each one of the virtual positions 261, 262, 263, and 264 may correspond to a respective displacement and rotation of SLP 220. Such is the case in WHUD 200 for which, as would be apparent to one of ordinary skill in the art, a line connecting each of the N=4 virtual positions 261, 262, 263, and 264 for SLP 220 in FIG. 2E would be a curved line.

Each one of the N=4 optical paths 271, 272, 273, and 274 of light signal 270 is output by exit pupil selector 250 and received by holographic combiner 230. As previously described, holographic combiner 230 includes at least one hologram that is operative (e.g., designed, crafted, encoded, recorded, and/or generally positioned and oriented) to redirect each one of the N=4 instances of light signal 270 to a respective region of eye 290 of the user. The particular region of eye 290 towards which holographic combiner 230 redirects each one of the N=4 instances of light signal 270 depends on the particular one of the N=4 optical paths 271, 272, 273, and 274 along which an instance of light signal 270 is received by holographic combiner 230, which in turn depends on the particular one of the N=4 configurations 251, 252, 253, and 254 into which exit pupil selector 250 is controllably switched. Advantageously, the at least one hologram of holographic combiner 230 may converge each one of the N=4 instances of light signal 270 to a respective one of N=4 exit pupils 281, 282, 283, and 284 at or proximate eye 290 of the user. Specifically: exit pupil selector 250 directs a first instance (represented by lines with large dashes) of light signal 270 along first optical path 271 towards holographic combiner 230 effectively from first virtual position 261 for SLP 220 and holographic combiner 230 converges the first instance of light signal 270 to first exit pupil 281 at or proximate eye 290; exit pupil selector 250 directs a second instance (represented by solid lines) of light signal 270 along second optical path 272 towards holographic combiner 230 effectively from second virtual position 262 for SLP 220 and holographic combiner 230 converges the second instance of light signal 270 to second exit pupil 282 at or proximate eye 290; exit pupil selector 250 directs a third instance (represented by dotted lines) of light signal 270 along third optical path 273 towards holographic combiner 230 effectively from third virtual position 263 for SLP 220 and holographic combiner 230 converges the third instance of light signal 270 to third exit pupil 283 at or proximate eye 290; and exit pupil selector 250 directs a fourth instance (represented by lines with alternating large and short dashes) of light signal 270 along fourth optical path 274 towards holographic combiner 230 effectively from fourth virtual position 264 for SLP 220 and holographic combiner 230 converges the fourth instance of light signal 270 to fourth exit pupil 284 at or proximate eye 290. The eyebox 280 of WHUD 200 is given by the total range of pupil positions (or gaze directions) for eye 290 in which at least one of exit pupils 281, 282, 283, and/or 284 impinges on the pupil. Without exit pupil selector 250, a single instance of light signal 270 (e.g., the second instance that travels along optical path 272, represented by solid lines) would impinge on eye 290 at a single exit pupil (e.g., at second exit pupil 282) to provide a relatively small eyebox. In such a configuration, displayed content would disappear from the user's point of view if and when the user gazed in a direction that caused the pupil of eye 290 to move away from the single exit pupil (e.g., away from second exit pupil 282). In accordance with the present systems, devices, and methods, SLP 220 and exit pupil selector 250 together replicate light signal 270 to produce N=4 (where 4 is an illustrative example) instances light signal 270 and because each of these four instances follows a different respective optical path 271, 272, 273, and 274 effectively originating from a different respective spatially-separated virtual position 261, 262, 263, and 264 for SLP 220, holographic combiner 230 converges each of these four instances to a respective spatially-separated exit pupil 281, 282, 283, and 284 at or proximate eye 290. Spatially-separated exit pupils 281, 282, 283, and 284 are distributed over an area of eye 290 that covers a wider range of pupil positions (e.g., gaze directions) than a single exit pupil (of the same size as any one of exit pupils 281, 282, 283 and 284) on its own. Thus, eyebox 280 is expanded by exit pupil replication in WHUD 200.

In the illustrated example, each of the N=4 configurations of exit pupil selector 250 changes the optical path of light signal 270 and causes light signal 270 to effectively originate from a respective virtual position 261, 262, 263, and 264 that is different from real position 260. However, in some implementations exit pupil selector 250 may include a configuration for which light signal 270 is directed to holographic combiner 230 effectively from real position 260 rather than from a virtual position.

Generally, light signal 270 may embody a variety of different forms, including without limitation: a single light signal, a single pixel of an image, multiple pixels of an image, or an image itself that comprises at least two pixels. When first light signal 270 corresponds to an image (e.g., comprising at least two pixels), then in each one of the N=4 different configurations exit pupil selector 250 may be positioned and oriented to receive a respective instance of the image generated by SLP 220 and redirect the respective instance of the image towards holographic combiner 230 effectively from a respective one of the N=4 spatially-separated virtual positions 261, 262, 263, and 264 for SLP 220. In this case, at least one hologram of holographic combiner 230 may be positioned and oriented to redirect each instance of the image received from exit pupil selector 250 towards eye 290. When first light signal 270 corresponds to one or more pixel(s) of an image, in each one of the N different configurations exit pupil selector 250 may be positioned and oriented to receive a respective instance of a same pixel in a different instance of a same image generated by SLP 220 and redirect the respective instance of the same pixel in the different instance of the same image towards holographic combiner 230 effectively from a respective one of the N=4 spatially-separated virtual positions 261, 262, 263, and 264 for SLP 220. In this case, at least one hologram of holographic combiner 230 may be positioned and oriented to redirect each instance of the same pixel in the different instance of the same image received from exit pupil selector 250 towards eye 290.

Figure 2F:
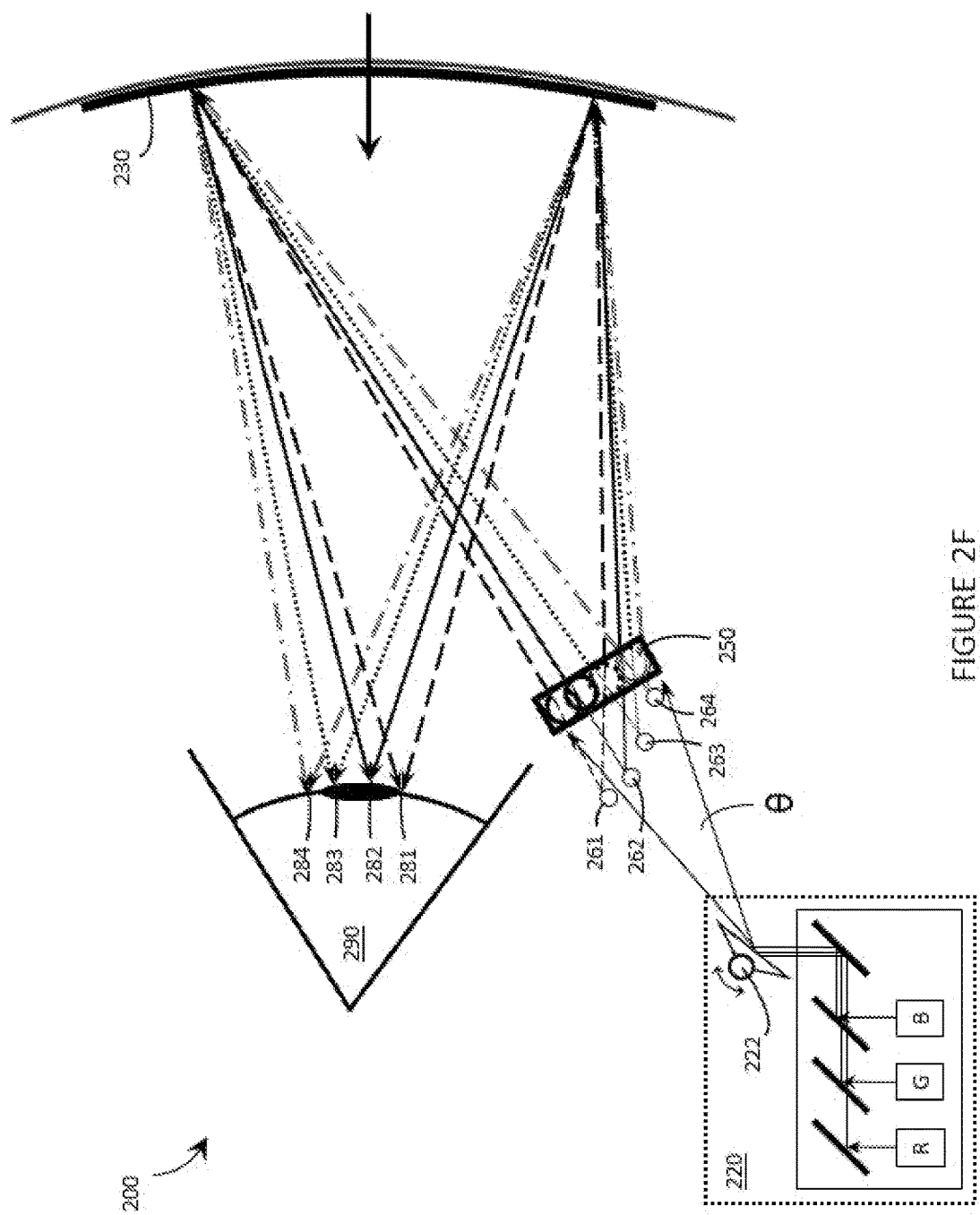
FIG. 2F is an illustrative diagram of the wearable heads-up display from FIGS. 2A, 2B, 2C, 2D, and 2E showing eyebox expansion by exit pupil replication for a sweep of the total scan range $\theta$ of the scanning laser projector in accordance with the present systems, devices, and methods.

FIG. 2F is an illustrative diagram of WHUD 200 from FIGS. 2A, 2B, 2C, 2D, and 2E showing eyebox expansion by exit pupil replication for a sweep of the total scan range θ of SLP 220 in accordance with the present systems, devices, and methods. In the operation of WHUD 200 depicted in FIG. 2F, SLP 220 sweeps through its total scan range θ. Throughout this specification and the appended claims, the "total scan range" of a SLP refers to the full range of angles and/or directions at which the SLP is operative to project light signals during normal use and is generally determined by the range of motion of the at least one scan mirror 222 in the SLP 220. The SLPs described herein are generally operative to draw a raster scan and the "total scan range" generally encompasses the outer perimeter of the full raster scan that the SLP is operative to draw. This may be accomplished by, for example, a SLP that employs a single scan mirror operative to scan in two orthogonal dimensions or two separate scan mirrors that are each operative to scan in a respective one of two orthogonal dimensions. An exemplary SLP may have a total scan range θ comprising a first scan range in a first dimension (e.g., in a horizontal dimension) and a second scan range in a second dimension (e.g., in a vertical dimension). The first and second scan ranges may each be between 0° and 180°, although in practice each may be within a narrower range, such as between 10° and 60°. The relative scan ranges in the first and second dimensions influence the aspect ratio of the WHUD.

Exit pupil selector 250 of WHUD 200 is positioned in the optical path (e.g., in all the optical paths) between SLP 220 and holographic combiner 230 for the total scan range θ of SLP 220. For each one of the N=4 different configurations 251, 252, 253, and 254 of exit pupil selector 250, exit pupil selector 250 is positioned and oriented to receive all light signals corresponding to a sweep of the total scan range θ by SLP 220 and redirect all light signals corresponding to the sweep of the total scan range θ of SLP 220 towards holographic combiner 230 effectively from a respective one of the N=4 spatially-separated virtual positions 261, 262, 263, and 264 for SLP 220. In other words, in a similar way to how a first light signal 270 is sequentially redirected by exit pupil selector 250 as four instances along four respective optical paths 271, 272, 273, and 274 towards holographic combiner 230 in the exemplary operation of WHUD 200 illustrated in FIG. 2E, FIG. 2F illustrates an exemplary operation of WHUD 200 in which all light signals corresponding to a first sweep of the total scan range θ of SLP 220 are controllably redirected by exit pupil selector 250 as four instances of all light signals corresponding to the sweep of the total scan range θ of SLP 220. The four instances of all light signals corresponding to the total scan range θ are not called out in FIG. 2F to reduce clutter but are drawn using the same distinguishable lines as used to distinguish between the different optical paths 271, 272, 273, and 274 of light signal 270 in FIG. 2E. That is, a first instance of all light signals corresponding to the sweep of the total scan range θ (represented by lines with large dashes) is redirected by exit pupil selector 250 towards holographic combiner 230 from first virtual position 261 for SLP 220, a second instance of all light signals corresponding to the sweep of the total scan range θ (represented by solid lines) is redirected by exit pupil selector 250 towards holographic combiner 230 from second virtual position 262 for SLP 220, a third instance of all light signals corresponding to the sweep of the total scan range θ (represented by dotted lines) is redirected by exit pupil selector 250 towards holographic combiner 230 from third virtual position 263 for SLP 220, and a fourth instance of all light signals corresponding to the sweep of the total scan range θ (represented by lines with alternating large and short dashes) is redirected by exit pupil selector 250 towards holographic combiner 230 from fourth virtual position 264 for SLP 220. At least one hologram of holographic combiner 230 receives the N=4 instances of all light signals corresponding to the sweep of the total scan range θ of SLP 220 and converges each respective one of the N=4 instances of all light signals corresponding to the sweep of the total scan range θ of SLP 220 to a respective one of the N=4 exit pupils 281, 282, 283, and 284 at or proximate eye 290.

In FIG. 2E, the N=4 instances of first light signal 270 (each corresponding to a respective one of optical paths 271, 272, 273, and 274) are all shown incident at or on about the same region of holographic combiner 230. Likewise, in FIG. 2F the N=4 instances of all light signals corresponding to the sweep of the total scan range θ of SLP 220 are all shown incident over the same completely-overlapping area of holographic combiner 230. In both cases, this configuration is exemplary and in practice alternative configurations may be preferred depending on the specific implementation. Generally, each instance of all light signals corresponding to a sweep of the total scan range θ of SLP 220 may be incident upon (and received by) a respective region or area of holographic combiner 230 and these respective areas of holographic combiner 230 may or may not completely overlap (e.g., such areas may partially overlap or correspond to separate, non-overlapping areas).

In a virtual retina display such as scanning laser-based WHUD 100 and/or scanning laser-based WHUD 200, there may not be an "image" formed outside of the eye of the user. There is typically no microdisplay or projection screen or other place where the projected image is visible to a third party; rather, the image may be formed completely within the eye of the user. For this reason, it may be advantageous for a scanning laser-based WHUD to be designed to accommodate the manner in which the eye forms an image.

For a light signal entering the eye (e.g., a light ray, a wavefront, an incident beam from a SLP, or similar), the eye (or more accurately, the combination of the eye and the human brain) may determine "where" the light signal is positioned in the user's field of view based on the region of the retina that is illuminated by the light signal. Two light signals that illuminate the same region of the retina may appear in the same position in the user's field of view. The particular region of the retina that is illuminated by any given light signal is determined by the angle and not the location at which the light signal enters the eye. Thus, two light signals may appear in the same position in the user's field of view even if they enter different locations of the user's pupil provided that the two light signals have the same angle of incidence when they enter the user's eye. The geometry of the eye's lens is such that any two light signals entering the eye at the same angle, regardless of the position/ location at which the light signals enter the eye, may generally be directed to the same region of the retina and so may generally appear in the same position in the user's field of view.

In at least some implementations, the scanning laser-based WHUDs described herein project multiple instances of the same image onto the retina of the eye in rapid succession. Even if the multiple instances are temporally-separated, the temporal separation may be small enough to be undetectable by the user. If any two of the multiple instances of the same image do not align/overlap on the eye's retina then those two instances of the image may not align/overlap in the user's field of view and undesirable effects such as ghosting can occur. In order to ensure that multiple instances of the same image (each corresponding to a respective exit pupil and each representing a respective instance of the same display content) align/overlap on the retina so that multiple instances of the image align/overlap in the user's field of view, a scanning laser-based WHUD may advantageously be configured to direct multiple instances of any given light signal (each corresponding to a respective exit pupil) towards the eye spatially in parallel with one another. More specifically and referring to FIG. 2E, the exit pupil selector 250 and/or the holographic combiner 230 may be configured, arranged and/or operated (either individually or in combination) so that the holographic combiner 230 redirects the N=4 instances of the first light signal 270 all spatially in parallel with one another towards respective regions (i.e., towards respective ones of N=4 spatially-separated exit pupils 281, 282, 283, and 284 from FIG. 2B) of the eye 290 of the user.

Figure 2G:
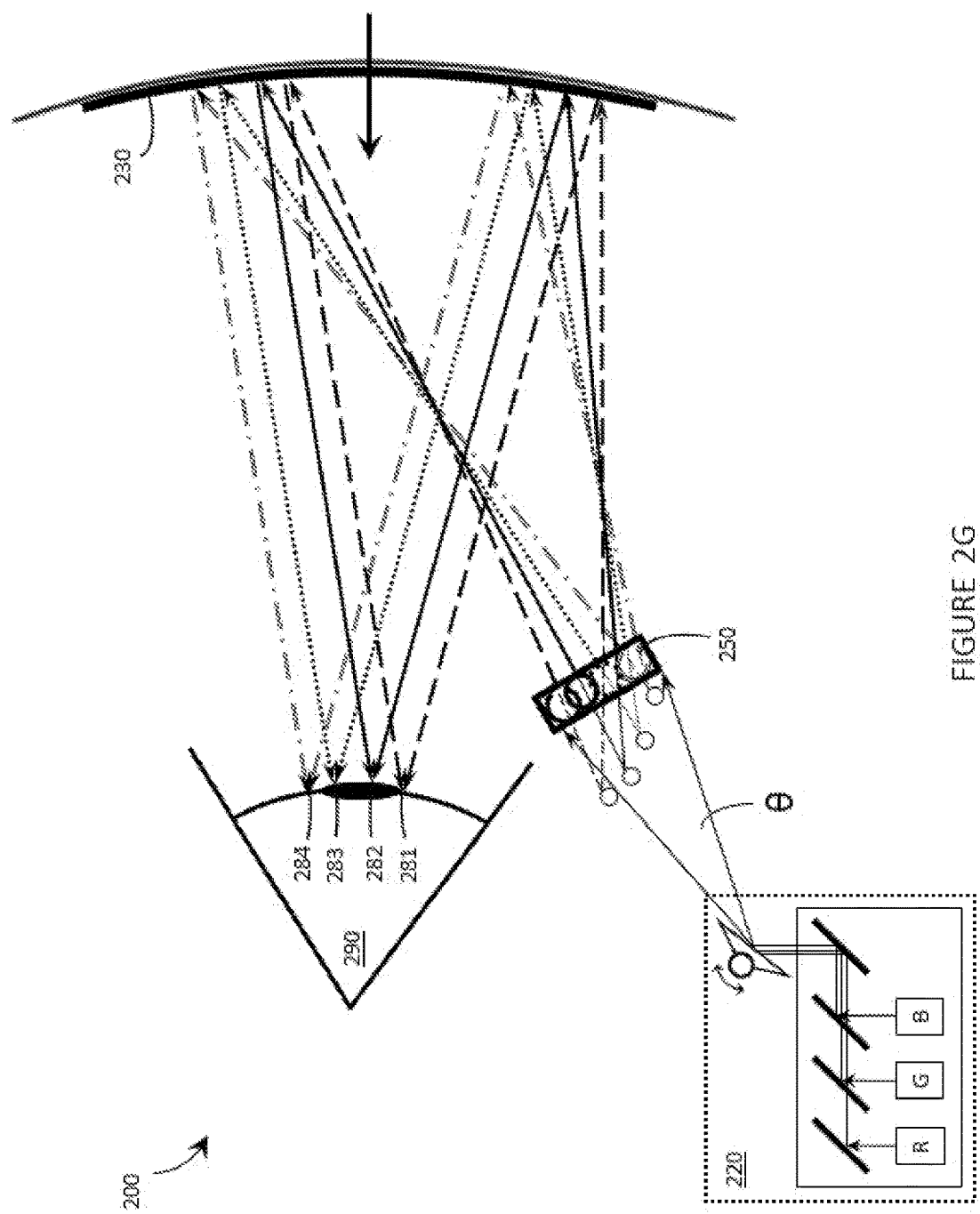
FIG. 2G is an illustrative diagram of the wearable heads-up display from FIGS. 2A, 2B, 2C, 2D, 2E, and 2F showing eyebox expansion by temporally sequential exit pupil replication with respective instances of the same display content projected spatially in parallel with one another towards respective exit pupils in accordance with the present systems, devices, and methods.

FIG. 2G is an illustrative diagram of WHUD 200 from FIGS. 2A, 2B, 2C, 2D, 2E, and 2F showing eyebox expansion by temporally sequential exit pupil replication with respective instances of the same display content (e.g., pixel(s)) projected spatially in parallel with one another towards respective exit pupils in accordance with the present systems, devices, and methods. In order to highlight some of the features shown in the implementation of FIG. 2G, the corresponding aspects of FIG. 2F will first be noted.

In the implementation of FIG. 2F, respective ones of the N=4 instances of all light signals corresponding to a sweep of the total scan range θ of SLP 220 all align with one another and completely overlap on holographic combiner 230. As a result, each of the N=4 exit pupils 281, 282, 283, and 284 converges at or proximate eye 290 from substantially the same area of holographic combiner 230. Because each of the N=4 exit pupils 281, 282, 283, and 284 originates from substantially the same area of holographic combiner 230 but converges to a respective spatially-separated region of eye 290, each of the N=4 exit pupils 281, 282, 283, and 284 necessarily includes at least some light signals having incident angles (at eye 290) that cannot be provided by at least one other one of the N=4 exit pupils 281, 282, 283, and 284. For example, the light signals (represented by large dashed lines) that converge to exit pupil 281 include at least some angles of incidence that are not included in the light signals (represented by solid lines) that converge to exit pupil 282, and vice versa. As previously described, the angle of incidence of a light signal as it enters the eye determines where in the user's field of view the light (or the pixel of an image embodied by the light signal) will appear. A light signal having an angle of incidence that is unique to one exit pupil can only be projected to a user when that exit pupil aligns with the user's pupil (e.g., when the user's gaze direction includes that exit pupil). Thus, when multiple spatially-separated exit pupils all originate from substantially the same spatial area on holographic combiner 230, only a limited sub-region of that spatial area may be used to provide angles of incidence that are common to all of the exit pupils and, consequently, only a limited fraction of the total scan range θ of the SLP 220 may be used to provide uniform image replication across all of the spatially-separated exit pupils. Having all of the N=4 instances of the total scan range θ of SLP 220 align and overlap on holographic combiner 230 can simplify some aspects of the design of exit pupil selector 250 and/or holographic combiner 230 but can also limit the available resolution and/or field of view of SLP 220 that can be replicated across all exit pupils.

In the implementation of FIG. 2G, exit pupil selector 250 is modified (e.g., in geometry, orientation, and/or composition) to shift the relative trajectories of the N=4 instances of all light signals corresponding to a sweep of the total scan range θ of SLP 220 compared to their corresponding trajectories in the implementation of FIG. 2F. The N=4 instances of all light signals corresponding to a sweep of the total scan range θ of SLP 220 (respectively represented by different line types in FIG. 2G as in FIG. 2F) do not align or completely overlap on holographic combiner 230 in FIG. 2G as they do in FIG. 2F. Instead, the N=4 instances of the total scan range θ of SLP 220 are spatially distributed over the area of holographic combiner 230 and each positioned so that the respective corresponding light signals are all substantially parallel to one another when redirected and converged by holographic combiner 230 towards respective ones of the N=4 spatially-separated exit pupils 281, 282, 283, and 284 at or proximate eye 290. That is, in FIG. 2G the light signals that are converged by holographic combiner 230 to each respective one of the N=4 exit pupils 281, 282, 283, and 284 all include the same angles of reflection from holographic combiner 230 and accordingly the same angles of incidence with respect to eye 290. In contrast to the implementation of FIG. 2F, in the implementation of FIG. 2G none of the N=4 exit pupils 281, 282, 283, and 284 includes a light signal having an angle of incidence (with respect to eye 290, or an angle of reflection with respect to holographic combiner 230) that is not also included in each of the other ones of the N=4 exit pupils 281, 282, 283, and 284. Each of the N=4 exit pupils 281, 282, 283, and 284 of the implementation in FIG. 2G includes the entire scan range θ of SLP 220 and therefore the implementation of WHUD 200 depicted in FIG. 2G can provide uniform image replication across multiple exit pupils (e.g., multiple temporally-separated and spatially-separated exit pupils) with larger field of view and/or higher resolution than the implementation of WHUD 200 depicted in FIG. 2F, at the cost of added complexity in exit pupil selector 250 and/or holographic combiner 230.

As previously described, holographic combiner 230 comprises at least one hologram embedded, encoded, recorded, or otherwise carried by at least one layer of holographic film. The holographic film may include, as examples, a photopolymer film such as Bayfol®HX from Bayer MaterialScience AG or a silver halide compound. The nature of the at least one hologram may depend on the specific implementation.

As a first example, holographic combiner 230 may include a single hologram that effectively operates as a fast-converging (e.g., convergence within about 1 cm, convergence within about 2 cm, or convergence within about 3 cm) mirror for light having the wavelength(s) provided by SLP 220. In this first example, the holographic film that carries the first hologram may have a relatively wide bandwidth, meaning the hologram recorded in the holographic film may impart substantially the same optical effect or function on all light signals projected by SLP 220 over a relatively wide range of angles of incidence at holographic combiner 230. For the purpose of the present systems, devices, and methods, the term "wide bandwidth" in relation to holograms and holographic films means an angular bandwidth that is greater than or equal to the total range of angles of incidence of all light signals received by the hologram or holographic film from an exit pupil selector. As an example, WHUD 200 may implement a wide bandwidth hologram in holographic combiner 230 having an angular bandwidth of greater than or equal to about 8°. In this case, the spatial separation between virtual positions 261, 262, 263, and 264 may be such that any given point, region, or location of holographic combiner 230 receives light signals (i.e., spanning all ranges of optical paths 271, 272, 273, and 274) spanning an 8° (or less) range of angles of incidence at holographic combiner 230.

Consistent with conventional mirror behavior, for a single wide-bandwidth fast-converging hologram carried by holographic combiner 230 the angles of incidence for a range of light signals incident on holographic combiner 230 may influence the angles of reflection for that range of light signals redirected by holographic combiner 230. Since holographic combiner 230 is, generally during normal operation of WHUD 200, fixed in place relative to SLP 220, the angles of incidence for a range of light signals are determined, at least in part, by the particular virtual position 261, 262, 263, or 264 for the SLP 220 from which exit pupil selector 250 causes the range of light signals to effectively originate. The spatial position of the exit pupil 281, 282, 283, or 284 to which the range of light signals is converged by holographic combiner 230 is then determined, at least in part, by the angles of reflection of that range of light signals from holographic combiner 230. Each one of virtual positions 261, 262, 263, and 264 provides light signals over a respective range of angles of incidence (generally but not necessarily with at least some overlap) at holographic combiner 230 and therefore holographic combiner 230 converges light signals from each one of virtual positions 261, 262, 263, and 264 to a respective one of exit pupils 281, 282, 283, and 284. This is why, referring to FIG. 2F for example, the instance of the total scan range θ of SLP 220 that effectively originates from virtual position 261 (represented by lines with large dashes) with a range of relatively small angles of incidence (compared to the other instances of the total scan range θ of SLP 220 that effectively originate from virtual positions 262, 263, and 264) maps to exit pupil 281 with a range of relatively small angles of reflection (compared to the other exit pupils 282, 283, and 284) and the instance of the total scan range θ of SLP 220 that effectively originates from virtual position 264 (represented by lines with alternating large and short dashes) with a range of relatively large angles of incidence (compared to the other instances of the total scan range θ of SLP 220 that effectively originate from virtual positions 261, 262, and 263) maps to exit pupil 284 with a range of relatively large angles of reflection (compared to the other exit pupils 281, 282, and 283).

As a second example, rather than a single hologram, holographic combiner 230 may instead include any number of multiplexed holograms. Multiplexed holograms may be advantageous when, for example, multiple wavelengths of light signals are used (e.g., red, green, and blue light signals generated by SLP 220) and/or to provide a further means to separate light signals effectively originating from different virtual positions for SLP 220. The "single hologram" example described above may be suitable for an implementation in which SLP 220 only provides light signals of a single wavelength (e.g., only red light signals, only green light signals, or only blue light signals), but for implementations in which SLP 220 provides light signals of multiple wavelengths it may be advantageous for holographic combiner 230 to include a respective wavelength multiplexed hologram for each respective wavelength of light signals provided by SLP 220 (e.g., each respective nominal wavelength of light signals provided by SLP 220, since a laser diode may generally provide light signals over a narrow waveband). Thus, when SLP 220 includes three different laser diodes each providing light signals of a respective nominal wavelength (e.g., a red laser diode, a green laser diode, and a blue laser diode) it may be advantageous for holographic combiner 230 to include three wavelength-multiplexed holograms (e.g., a red hologram, a green hologram, and a blue hologram) each designed to work (e.g., "playback") for light signals having a respective one of the three nominal wavelengths. In this example, at least one "red hologram" (i.e., at least one hologram that is designed to playback for light signals having a wavelength that corresponds to red light) may converge a respective red component of each one of the N=4 instances of the total scan range θ of SLP 220 to a respective one of the N=4 exit pupils 281, 282, 283, and 284, at least one "green hologram" (i.e., at least one hologram that is designed to playback for light signals having a wavelength that corresponds to green light) may converge a respective green component of each one of the N=4 instances of the total scan range θ of SLP 220 to a respective one of the N=4 exit pupils 281, 282, 283, and 284, and at least one blue hologram (i.e., at least one hologram that is designed to playback for light signals having a wavelength that corresponds to blue light) may converge a respective blue component of each one of the N=4 instances of the total scan range θ of SLP 220 to a respective one of the N=4 exit pupils 281, 282, 283, and 284.

As a third example, either apart from or in addition to multiple wavelength-multiplexed holograms, holographic combiner 230 may include at least N angle-multiplexed holograms. That is, for an implementation with N=4 virtual positions 261, 262, 263, and 264 for the SLP 220 and N=4 exit pupils 281, 282, 283, and 284, holographic combiner 230 may include at least N=4 angle-multiplexed holograms (or N=4 sets of angle-multiplexed holograms when wavelength multiplexing is also employed, as discussed later on). Each of the N=4 angle-multiplexed holograms may be designed to playback for light signals effectively originating from a respective one of the N=4 virtual positions 261, 262, 263, and 264 for SLP 220 and converge such light signals to a respective one of the N=4 exit pupils 281, 282, 283, and 284. That is, a first angle-multiplexed hologram may be designed to playback for light signals effectively originating from first virtual position 261 for SLP 220 and converge such light signals to first exit pupil 281, a second angle-multiplexed hologram may be designed to playback for light signals effectively originating from second virtual position 262 for SLP 220 and converge such light signals to second exit pupil 282, a third angle-multiplexed hologram may be designed to playback for light signals effectively originating from third virtual position 263 for SLP 220 and converge such light signals to third exit pupil 283, and a fourth angle-multiplexed hologram may be designed to playback for light signals effectively originating from fourth virtual position 264 for SLP 220 and converge such light signals to fourth exit pupil 284.

For implementations that employ angle-multiplexing, it may be advantageous for the holographic film that includes an angle-multiplexed hologram to be of relatively narrow bandwidth. Particularly, it may be advantageous for the holographic film to have an angular bandwidth that is less than or about equal to the minimum difference between the respective angles of incidence of two light signals that are incident on the same point, region, or location of holographic combiner 230 but effectively originate from different virtual positions 261, 262, 263, and 264. As an example, WHUD 200 may implement a narrow bandwidth angle-multiplexed hologram in holographic combiner 230 having an angular bandwidth of less than or equal to about 4°. In this case, the difference between the angle of incidence (at holographic combiner 230) of a light signal following a first optical path 271 that effectively originates from virtual position 261 and is incident at a first point on holographic combiner 230 and the angle of incidence (at holographic combiner 230) of a light signal following a second optical path 272 that effectively originates from virtual position 262 and is incident at the same first point on holographic combiner 230 may be less than or equal to about 4°. In this way, each respective angle-multiplexed hologram in holographic combiner 230 may be designed to substantially exclusively playback for light signals effectively originating from a respective one of virtual positions 261, 262, 263, and 264 for SLP 220 and to substantially not playback (e.g., insubstantially playback) for light signals effectively originating from the other ones of virtual positions 261, 262, 263, and 264 for SLP 220.

Generally, holographic combiner 230 may include at least N multiplexed holograms and each one of the at least N multiplexed holograms may converge a respective one of the N instances of a light signal from exit pupil selector 250 to a respective one of N exit pupils at or proximate the eye 290 of the user.

Some implementations may employ both wavelength multiplexing and angle multiplexing. For example, an implementation that employs angle multiplexing and light signals of multiple wavelengths (e.g., a multi-color SLP) may advantageously also employ wavelength multiplexing. In this case, holographic combiner 230 may include a wavelength-multiplexed and angle-multiplexed holographic combiner that includes at least N angle-multiplexed red holograms, at least N angle-multiplexed green holograms, and at least N angle-multiplexed blue holograms. Each one of the at least N angle-multiplexed red holograms may converge a respective red component of each one of N instances of any given light signal to a respective one of N exit pupils at or proximate the eye of the user, each one of the at least N angle-multiplexed green holograms may converge a respective green component of each one of N instances of any given light signal to a respective one of N exit pupils at or proximate the eye of the user, and each one of the at least N angle-multiplexed blue holograms may converge a respective blue component of each one of N instances of any given light signal to a respective one of N exit pupils at or proximate the eye of the user.

Implementations of holographic combiner 230 that employ multiple multiplexed holograms may include multiple holograms in or on a single layer (i.e., all in or on the same layer) of holographic film or may include multiple layers of holographic film with each layer of holographic film carrying at least one respective hologram. Holographic combiner 230 may or may not comprise at least one volumetric holographic optical element. Generally, holographic combiner 230 may comprise a single layer of holographic film that carries any number of holograms or holographic combiner 230 may comprise multiple layers of holographic film (e.g., multiple layers laminated together) with each respective layer of holographic film carrying any number of respective holograms.

Holographic combiner 230 may be substantially flat or planar in geometry or, as illustrated in FIGS. 2A, 2B, 2C, 2D, 2E, 2F, and 2G, holographic combiner 230 may embody some curvature. In some implementations, holographic combiner 230 may embody curvature because holographic combiner 230 is carried by a prescription eyeglass lens 240 that has some curvature. When necessary, holographic combiner 230 may include systems, devices, and/or methods for curved holographic optical elements described in U.S. Provisional Patent Application Ser. No. 62/268,892.

The various embodiments described herein provide systems, devices, and methods for eyebox expansion by exit pupil replication in scanning laser-based WHUDs. Each replicated exit pupil is aligned to a respective spatially-separated position at or proximate the eye of the user because the exit pupil selector selectively routes the light signals along spatially-separated optical paths that each trace back to (e.g., each appear to effectively originate from) a different spatially-separated virtual position for the SLP. The effect is substantially the same as if multiple SLPs were used instead of the exit pupil selector, with each SLP positioned in a respective one of the virtual positions and with each SLP projecting a respective instance of a light signal towards the holographic combiner; however, the use of the exit pupil selector has considerable advantages in terms of power savings and minimizing hardware bulk.

One potential drawback to exit pupil replication may arise from the fact that, in general, replicated or repeated instances of a light signal may all embody substantially the same light signal. This can be problematic when, for example, each instance of an image is made to effectively originate from a different spatially-separated virtual position for the SLP. In that case, each instance of the image may be subject to a unique combination of optical distortions. For example, a first instance of an image effectively originating from a first virtual position may be subject to a first set of optical distortions (e.g., image skewing, keystoning, aberrations, and so on) resulting from the unique optical path of the first instance of the image through the exit pupil selector and/or from the range of angles of incidence (at holographic combiner 230 and/or at eye 290) that correspond to the first virtual position for the SLP, while a second replicated or repeated instance of the image effectively originating from a second virtual position may be subject to a second set of optical distortions resulting from the unique optical path of the second instance of the image through the exit pupil selector and/or from the range of angles of incidence (at holographic combiner 230 and/or at eye 290) that correspond to the second virtual position for the SLP. If the first and second replicated or repeated instances of the image both correspond to the same initial version of the image defined by the SLP then there may be no opportunity to optically tune, adjust, correct, or otherwise compensate for distortions that are specific to the individual first and second instances of the image. In accordance with the present systems, devices, and methods, this problem may be overcome (if necessary) by specifically defining the parameters of each light signal generated by the SLP to accommodate, match, compensate for, or generally account for the specific configuration of the exit pupil selector when the light signal is generated. Returning to FIG. 2E for example, SLP 220 may sequentially generate four respective, temporally-separated instances of a first light signal 270, each one corresponding to a same pixel of a same image (e.g., a same pixel of a different instance of a same image). Each successive instance of first light signal 270 generated by SLP 220 coincides with a respective one of N=4 configurations (251, 252, 253, and 254, not called out in FIG. 2E to reduce clutter) of exit pupil selector 250 and, therefore, each successive instance of first light signal 270 generated by SLP 220 corresponds to a respective one of N=4 optical paths 271, 272, 273, and 274. At least in part because each successive instance of light signal 270 follows a unique one of N=4 optical paths 271, 272, 273, and 274 to holographic combiner 230, each successive instance of first light signal 270 may be subject to a unique form or combination of optical distortion(s). In accordance with the present systems, devices, and methods, such non-uniform optical distortions across successive instances of light signal 270 and therefore across exit pupils 281, 282, 283, and 284 may be addressed (e.g., accommodated, compensated for, or accounted for) by modulating SLP 220 to adjust the parameters that define each successive instance of light signal 270. That is, a first instance of first light signal 270 may be generated by SLP 220 and defined to accommodate optical distortions arising from first configuration 251 of exit pupil selector 250 and/or from first optical path 271, a second instance of first light signal 270 may be generated by SLP 220 and defined to accommodate optical distortions arising from second configuration 252 of exit pupil selector 250 and/or from second optical path 272, a third instance of first light signal 270 may be generated by SLP 220 and defined to accommodate optical distortions arising from third configuration 253 of exit pupil selector 250 and/or from third optical path 273, and a fourth instance of first light signal 270 may be generated by SLP 220 and defined to accommodate optical distortions arising from fourth configuration 254 of exit pupil selector 250 and/or from fourth optical path 274. Even though the four successive instances of first light signal 270 may all represent the same pixel of the same image, each one of the four instances of first light signal 270 may have a different composition (e.g., a different combination of relative color and/or intensity parameters) designed to accommodate the optical distortions that are particular to the specific optical path that the instance of first light signal 270 will follow to holographic combiner 230. In this way, the four replicated/repeated instances of first light signal 270 may appear substantially similar to the user when viewed by the user at respective ones of the N=4 exit pupils 281, 282, 283, and 284.

Exit pupil selector 250 effectively selects (e.g., routes light signals towards) any given one of N=4 exit pupils 281, 282, 283, and 284 at eye 290 by controllably switching at least one dynamic optical element into one of N=4 configurations. This redundancy enables WHUD 200 to rapidly display N=4 instances of the same image at N=4 different regions of eye 290 and thereby expand the eyebox 280 of the system to encompass all four exit pupils 281, 282, 283, and 284. However, in some applications or implementations, only one instance of an image may need to be (or want to be) displayed to eye 290 at any given time. Such can simplify the operation of SLP 220 and save the power required to produce multiple potentially redundant instances of the same image. In accordance with the present systems, devices, and methods, a WHUD may include an eye tracker communicatively coupled to an exit pupil selector (either directly or by common communicative coupling to another element, such as a processor or non-transitory processor-readable storage medium) and exit pupil selector 250 may controllably switch into and between respective ones of N different configurations based on the gaze direction of the eye of the user determined by the eye tracker.

Figure 3:
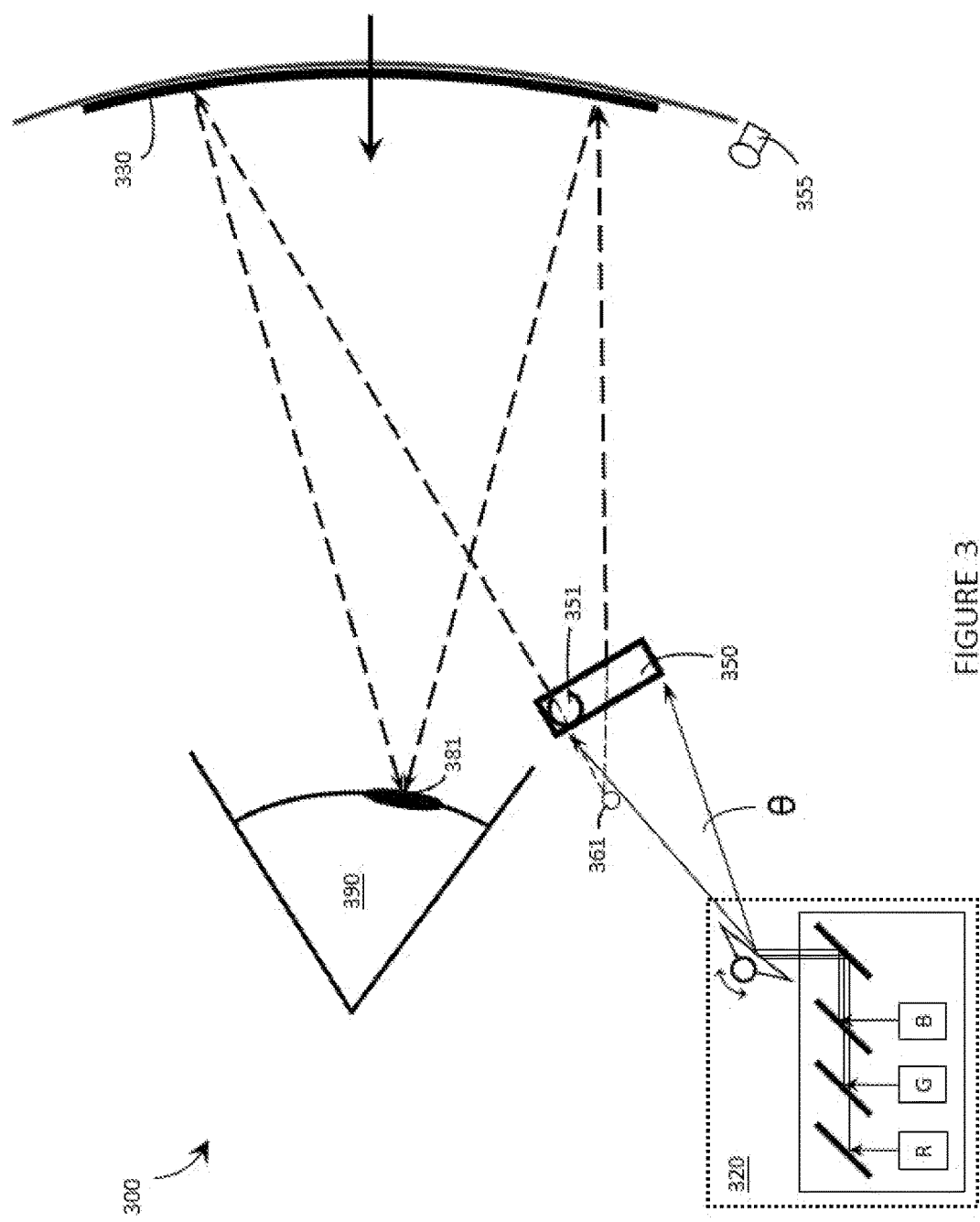
FIG. 3 is an illustrative diagram of a wearable heads-up display in operation showing specific exit pupil selection in accordance with the present systems, devices, and methods.

FIG. 3 is an illustrative diagram of a WHUD 300 in operation showing specific exit pupil selection in accordance with the present systems, devices, and methods. WHUD 300 may be substantially similar to WHUD 200 from FIGS. 2A, 2B, 2C, 2D, 2E, 2F, and 2G with the addition of an eye tracker 355 (carried by the support structure of WHUD 300 which is not shown in FIG. 3 to reduce clutter), positioned and oriented to determine a gaze direction of the eye 390 of the user. In the illustrated operation of WHUD 300 depicted in FIG. 3, eye tracker 355 determines that the pupil of eye 390 is generally positioned in the region corresponding to exit pupil 381. Accordingly, exit pupil selector 350 switches into (e.g., at least one dynamic optical element of exit pupil selector 350 switches into) a first configuration 351 in which exit pupil selector 350 (e.g., at least one dynamic optical element of exit pupil selector 350) is positioned and oriented to receive light signals from SLP 320 (e.g., any or all light signals in the total scan range θ of SLP 320) and redirect those light signals to holographic combiner 330 effectively from a virtual position 361 for SLP 320. The trajectory or optical path (e.g., the angle(s) of incidence) of light signals that effectively come from virtual position 361 to holographic combiner 330 is such that holographic combiner 330 converges the light signals (e.g., at corresponding angle(s) of reflection) to exit pupil 381 at eye 390. Rather than rapidly switching between all N=4 configurations to produce all N=4 exit pupils (and accordingly modulating SLP 320 to produce N=4 instances of each light signal), exit pupil selector 350 may stay in the first configuration 351 and SLP 320 may provide only single instances of each light signal (although multiple instances of any given light signal may still be used if desired, if sufficiently rapidly modulated) for as long as eye tracker 355 detects that the pupil of eye 390 aligns with exit pupil 381. If and when eye tracker 355 detects that the pupil of eye 390 moves away from exit pupil 381 and towards another available exit pupil, exit pupil selector 350 may switch into a new configuration to cause light signals from SLP 320 to be directed towards whichever available exit pupil best aligns with the pupil of eye 390. As previously described, when light signals are controllably routed to a particular exit pupil through a particular configuration of exit pupil selector 350 and along a particular optical path, SLP 320 may (re-)calibrate to apply optical distortion offsets to generated light signals in order to accommodate the optical distortion profile that is particular to that configuration of exit pupil selector 350 and/or that particular optical path.

Eye tracker 355 may employ any of a variety of different eye tracking technologies depending on the specific implementation. For example, eye tracker 355 may employ any or all of the systems, devices, and methods described in U.S. Provisional Patent Application Ser. No. 62/167,767; U.S. Provisional Patent Application Ser. No. 62/271,135; U.S. Provisional Patent Application Ser. No. 62/245,792; and/or U.S. Provisional Patent Application Ser. No. 62/281,041.

As previously described, WHUD 300 may include at least one processor and at least one non-transitory processor-readable storage medium or memory communicatively coupled thereto. The at least one memory may store processor-executable data and/or instructions that, when executed by the at least one processor, cause the at least one processor to control the operation of any or all of exit pupil selector 350, eye tracker 355, and/or SLP 320.

The illustrative examples of the present systems, devices, and methods depicted in FIGS. 2A, 2B, 2C, 2D, 2E, 2F, 2G, and 3 are all generally shown in two-dimensions and generally illustrate eyebox configurations in which multiple exit pupils are spatially separated in one dimension across the eye of the user. In practice, the expanded eyebox configurations described herein may comprise any number N of replicated or repeated exit pupils arranged in any two-dimensional configuration over the area of the eye of the user. An example configuration with N=4 replicated/repeated exit pupils is provided in FIG. 4.

Figure 4:
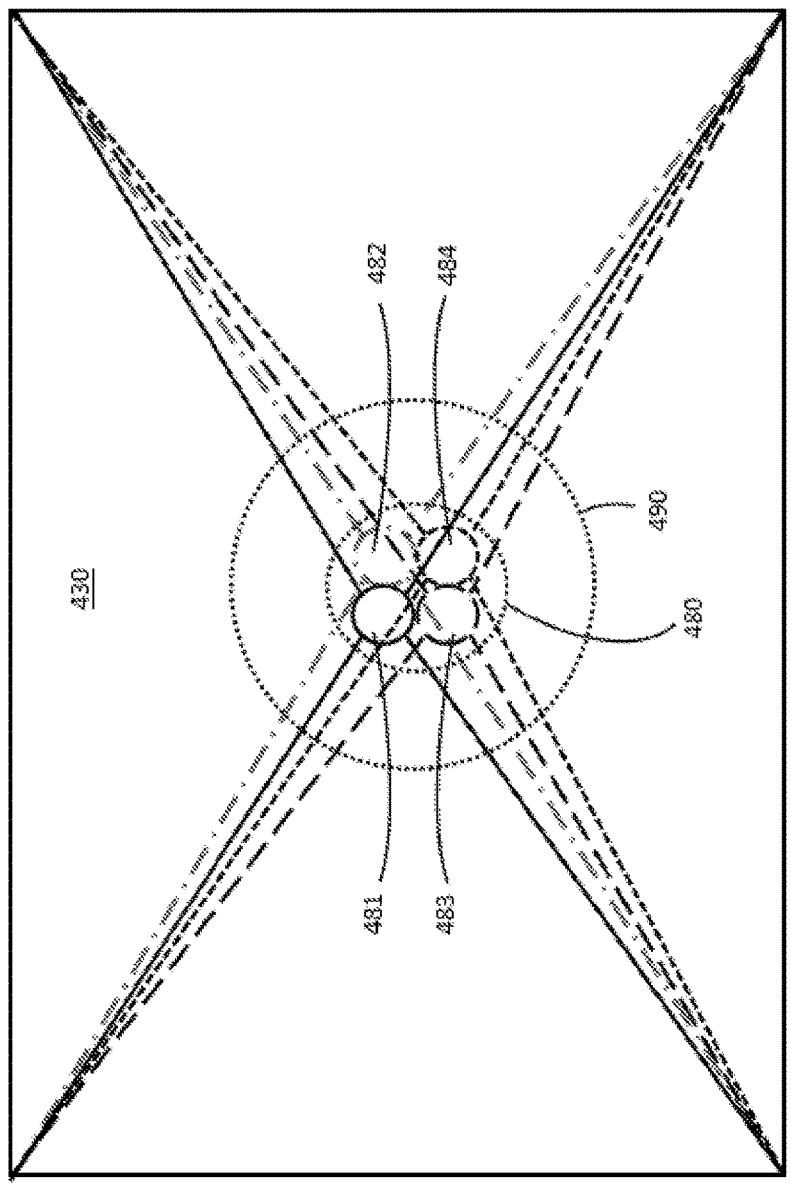
FIG. 4 is an illustrative diagram showing an exemplary holographic combiner in two-dimensions converging four instances of replicated (e.g., repeated) light signals to form an expanded eyebox comprising four spatially-separated exit pupils at or proximate the eye of a user in accordance with the present systems, devices, and methods.

FIG. 4 is an illustrative diagram showing an exemplary holographic combiner 430 in two-dimensions converging four instances of replicated (e.g., repeated) light signals to form an expanded eyebox 480 comprising four spatially-separated exit pupils 481, 482, 483, and 484 at or proximate the eye 490 of a user in accordance with the present systems, devices, and methods. Exit pupils 481, 482, 483, and 484 are distributed over a two-dimensional area at or near eye 490 to cover a wide range of pupil positions (e.g., gaze directions) for eye 490. As long as the pupil of eye 490 is positioned within eyebox 480, at least one of exit pupils 481, 482, 483, and 484 (in some cases a combination of at least two of exit pupils 481, 482, 483, and 484) will provide light signals through the pupil to eye 490 and the user will be able to see the projected image. In terms of optical path, each one of exit pupils 481, 482, 483, and 484 may receive light signals corresponding to a respective replicated (e.g., repeated) instance of the total scan range θ of an SLP.

Exemplary exit pupil selectors 250 and 350 drawn in FIGS. 2A, 2B, 2C, 2D, 2E, 2F, 2G, and 3 are simplified representations. Such representations are shown for illustrative purposes only and not intended to limit the composition of the exit pupil selectors described herein to structures of similar composition and/or geometry. As previously described, the exit pupil selectors described herein may comprise any of a variety of different components depending on the specific implementation. A non-limiting example of the construction and operation of an exit pupil selector as described herein is provided in FIG. 5.

Figure 5:
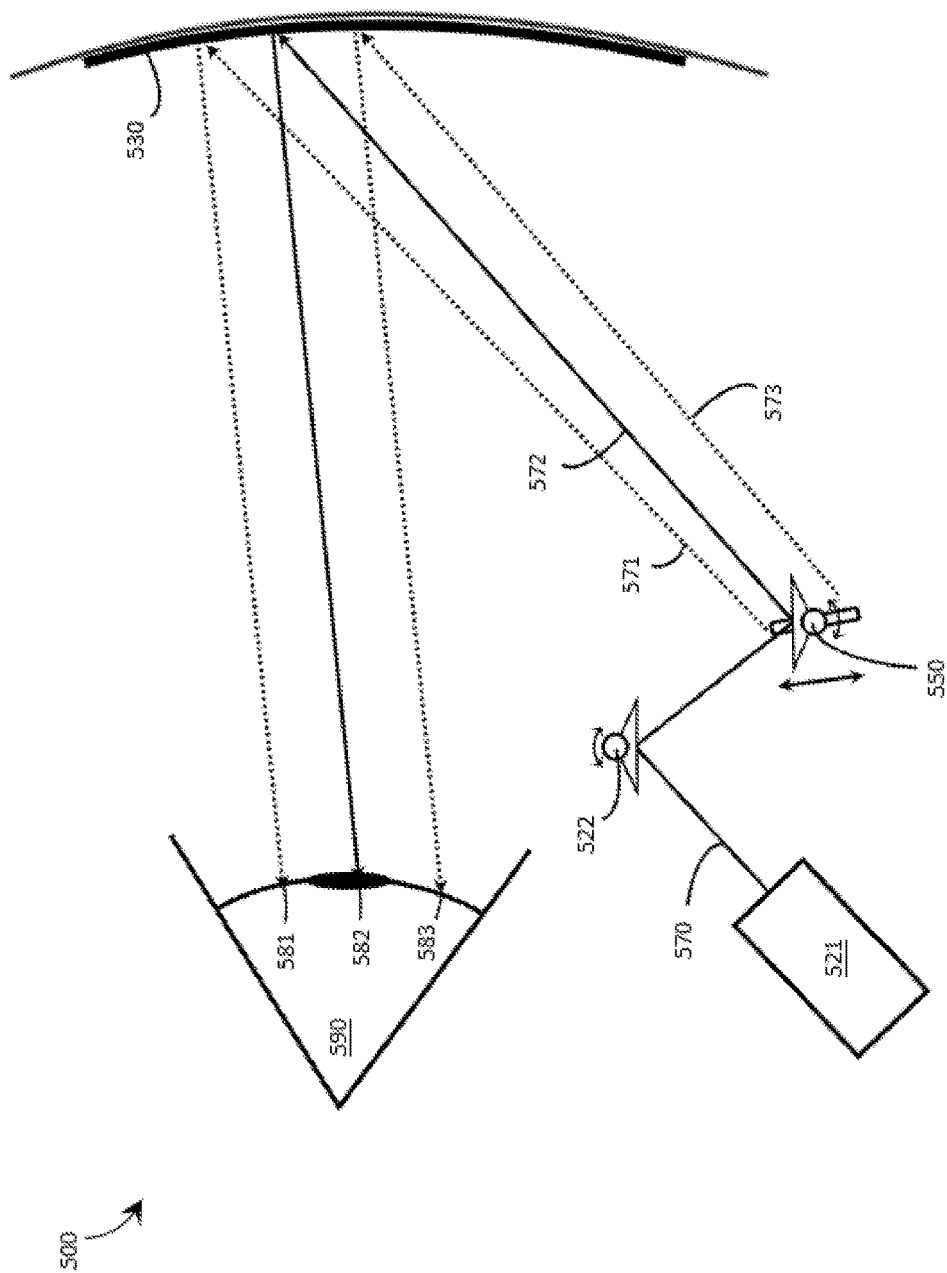
FIG. 5 is an illustrative diagram of a wearable heads-up display in operation showing eyebox expansion by exit pupil replication using an exemplary exit pupil selector in accordance with the present systems, devices, and methods.

FIG. 5 is an illustrative diagram of a WHUD 500 in operation showing eyebox expansion by exit pupil replication using an exemplary exit pupil selector 550 in accordance with the present systems, devices, and methods. WHUD 500 includes a support structure (not shown in FIG. 5 to reduce clutter) that may generally resemble a typical eyeglass frame and a SLP that comprises a laser module 521 (e.g., an RGB laser module) and at least one scan mirror 522. In use, laser module 521 produces a series of light signals 570 corresponding to: a) respective portions (e.g., different pixels) of an image to be displayed to a user, and b) respective instances of each respective portion (e.g., repeated instances of the same pixel) of the image. Light signals 570 are directed from laser module 521 to at least one scan mirror (such as a MEMS-based digital micromirror) 522 that is controllably variable (e.g., variable in rotational orientation, curvature, or the like) to reflect the light signals 570 to select regions of a holographic combiner 530. Holographic combiner 530 redirects (e.g., reflects and/or optionally converges) light signals 570 towards the user's eye 590 and into the user's field of view. In order to increase the effective eyebox of WHUD 500, WHUD 500 further includes an exit pupil selector 550 that interrupts the optical path between scan mirror 522 (or laser module 521) and holographic combiner 530. In the illustrated embodiment, exit pupil selector 550 comprises a dynamic mirror that is controllably rotatable and controllably translatable. For example, exit pupil selector 550 includes a MEMS-based or piezo-based mirror that is controllably rotatable about an axis and that axis itself is slidabley coupled to a slot, channel, or guide. Through combinations of rotations and translations, exit pupil selector 550 is controllably switchable into and between at least N=3 different configurations. In each one of the N=3 configurations, the dynamic mirror of exit pupil selector 550 is positioned and oriented to receive light signals 570 from scan mirror 522 and redirect light signals 570 along a respective one of N=3 different optical paths 571, 572, and 573 towards holographic combiner 530. Holographic combiner 530 receives light signals 570 from exit pupil selector 550 and redirects light signals 570 towards a particular one of N=3 exit pupils 581, 582, and 583 at eye 590 depending on the particular optical path 571, 572, and 573 along which light signals 570 are incident on holographic combiner 530. In the illustrated example of FIG. 5, the dynamic mirror of exit pupil selector 550 is switched into a configuration in which it is positioned and oriented to receive a light signal 570 from scan mirror 522 and redirect the light signal 570 along second optical path 572 towards holographic combiner 530. Optical paths 571 and 573 correspond to two other configurations of exit pupil selector 550 and are illustrated in dashed lines in FIG. 5 to indicate that optical paths 571 and 573 are not currently selected by exit pupil selector 550.

In accordance with the present systems, devices, and methods, the range of configurations available to (e.g., controllably switchable into by) an exit pupil selector may be discrete configurations corresponding to discrete rotational and/or translational configurations of at least one dynamic optical element of the exit pupil selector, or the range of configurations available to (e.g., controllably switchable into by) an exit pupil selector may be a continuum (e.g., a continuous range) of different configurations available in between one or more bounds. For example, FIG. 5 depicts three available optical paths 571, 572, and 573 for a light signal 570 corresponding to thee discrete configurations for exit pupil selector 550. However, in alternative implementations, exit pupil selector 550 may be continuously configurable between a first configuration corresponding to optical path 571 for light signal 570 and optical path 573 for light signal 570. In applications or implementations for which it is generally preferred to provide a fixed eyebox geometry at the eye with substantially fixed exit pupil positions, a finite number of discrete configurations for the exit pupil selector may be preferred. On the other hand, in applications or implementations for which it is preferred to provide a dynamic eyebox geometry and/or one or more dynamically variable exit pupils, a continuous range of configurations for the exit pupil selector may be preferred. As an example, an implementation of WHUD 500 that includes an eye tracker to monitor the gaze direction of eye 590 may advantageously allow continuously variable tuning of the position (e.g., translational position) and orientation (e.g., rotational orientation) of exit pupil selector 550. In such a configuration, exit pupil selector 550 may continuously vary in real-time in response to inputs from the eye tracker in order to continuously vary the location of a single exit pupil to follow the position of the pupil of eye 590. In other words, an eye tracker may continuously report on the user's gaze direction in real-time and, based on this information, exit pupil selector 550 may continuously vary its position and/or orientation in real-time in order to steer a single exit pupil and track the pupil of eye 590 (e.g., exit pupil selector 550 may maintain alignment between the exit pupil of WHUD 500 and the entrance pupil of eye 590), thereby keeping display content visible to the user over a range of gaze directions. In order to enable such real-time exit pupil steering, communicative coupling between an eye tracker (e.g., eye tracker 355) and exit pupil selector 550 (either directly or through one or more communicative coupling(s) to one or more intervening elements, such as a processor or memory) may advantageously provide feedback between the eye tracker and exit pupil selector 550 (e.g., at least one-way feedback from the eye tracker to exit pupil selector 550).

In addition to various WHUD systems and devices that provide eyebox expansion by exit pupil replication (e.g., exit pupil repetition), the various embodiments described herein also include methods of expanding the eyebox of a WHUD by exit pupil replication.

Figure 6:
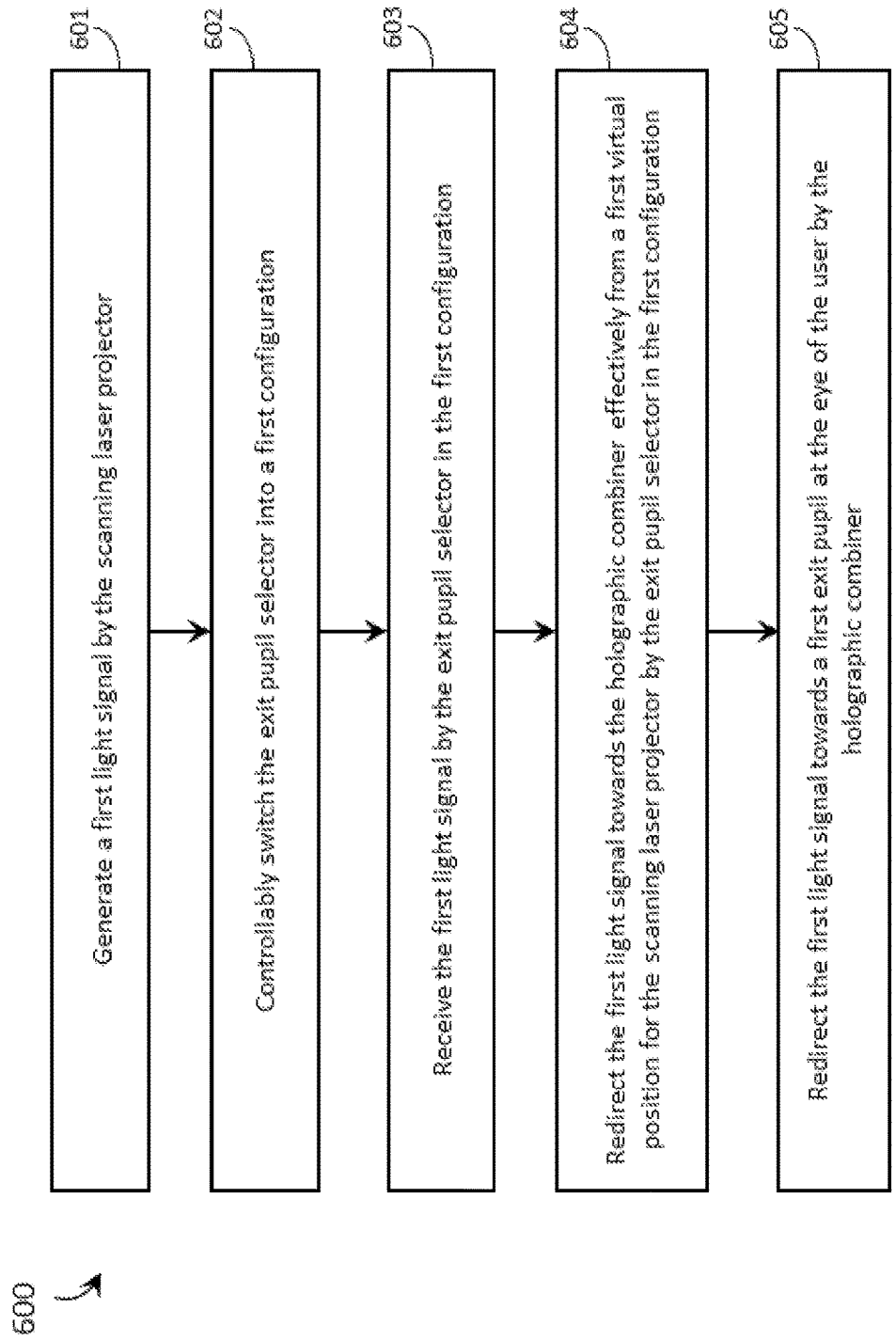
FIG. 6 is a flow-diagram showing a method of operating a wearable heads-up display in accordance with the present systems, devices, and methods.

FIG. 6 is a flow-diagram showing a method 600 of operating a WHUD in accordance with the present systems, devices, and methods. The WHUD may be substantially similar to WHUD 100, WHUD 200, or WHUD 300 (as appropriate based on the descriptions of the specific acts that follow) and generally includes a SLP, an exit pupil selector, and a holographic combiner. Method 600 includes five acts 601, 602, 603, 604, and 605 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 600, the term "user" refers to a person that is wearing the WHUD.

At 601, an SLP of the WHUD generates a first light signal. The first light signal may represent a complete image or a portion of an image. For example, the first light signal may represent one or more pixel(s) of an image.

At 602, the exit pupil selector controllably switches into a first configuration. Switching of the exit pupil selector into the first configuration may be controlled by another component of the WHUD, such as a processor communicatively coupled to a non-transitory processor-readable storage medium or memory that stores processor-executable exit pupil selector control data and/or instructions that, when executed by the processor, cause the processor to controllably switch the exit pupil selector into the first configuration. In some implementations, the exit pupil selector may be driven substantially continuously at a resonance frequency (e.g., if the exit pupil selector includes a MEMS-based dynamic optical element) and act 602 may correspond to an instant in time at which the exit pupil selector is in the first configuration.

At 603, the exit pupil selector receives the first light signal while the exit pupil selector is in the first configuration. The first configuration of the exit pupil selector may correspond to a particular position (e.g., translational position) and/or orientation (e.g., rotational orientation) of at least one dynamic optical element of the exit pupil selector.

At 604, the exit pupil selector in the first configuration redirects the first light signal towards the holographic combiner effectively from a first virtual position for the SLP. In other words, after receiving the first light signal from the SLP at 603, at 604 the exit pupil selector redirects the first light signal towards the holographic combiner along a first optical path that traces back to a first virtual position for the SLP so that the first light signal effectively appears to originate from the first virtual position for the SLP as opposed to from the actual real position for the SLP.

At 605, the holographic combiner redirects the first light signal towards a first exit pupil at the eye of the user. The spatial position of the first exit pupil at the eye of the user (and consequently the alignment between the first exit pupil and the entrance pupil of the eye of the user) may depend on the particular optical path taken by the first light signal between the exit pupil selector and the holographic combiner, which in turn may depend on the configuration of the exit pupil selector at 602. Thus, the first configuration of the exit pupil selector effectively selects the spatial position of the exit pupil (e.g., selects the first exit pupil at a first spatial position among other available exit pupils at other spatial positions).

Method 600 may be extended in various ways. For example, the SLP may generate a second light signal, the exit pupil selector may controllably switch into a second configuration (e.g., while fluctuating at resonance or in response to deliberate instructions from a control processor), the exit pupil selector may receive the second light signal while in the second configuration and redirect the second light signal towards the holographic combiner effectively from a second virtual position for the SLP (the second virtual position for the SLP spatially-separated from the first virtual position for the SLP), and the holographic combiner may redirect the second light signal towards a second exit pupil at the eye of the user (the second exit pupil spatially-separated from the first exit pupil). Depending on the specific implementation, the first light signal may correspond to a first instance of a light signal (e.g., representing a first pixel of an image) and the second light signal may correspond to a second instance (temporally-separated from the first instance) of the same light signal (e.g., a second instance of the same first pixel of the image). In this case, the first and second light signals may be nominally identical to one another except they may or may not each include particular calibration parameters (e.g., respectively distinct color and/or intensity profiles) to compensate for optical distortions that are particular to their respective optical paths through the exit pupil selector, towards the holographic combiner, and/or from the holographic combiner to the eye of the user. Alternatively, the first light signal may correspond to a first pixel of an image and the second light signal may correspond to a second pixel of the same image. Such may be preferable if, for example, the WHUD includes an eye tracker and the exit pupil selector is actively tracking/following the eye's pupil (e.g., actively causing the exit pupil of the WHUD to align with the pupil of the eye in real-time while the pupil of the eye may be moving) while an image is projected by the SLP.

Figure 7:
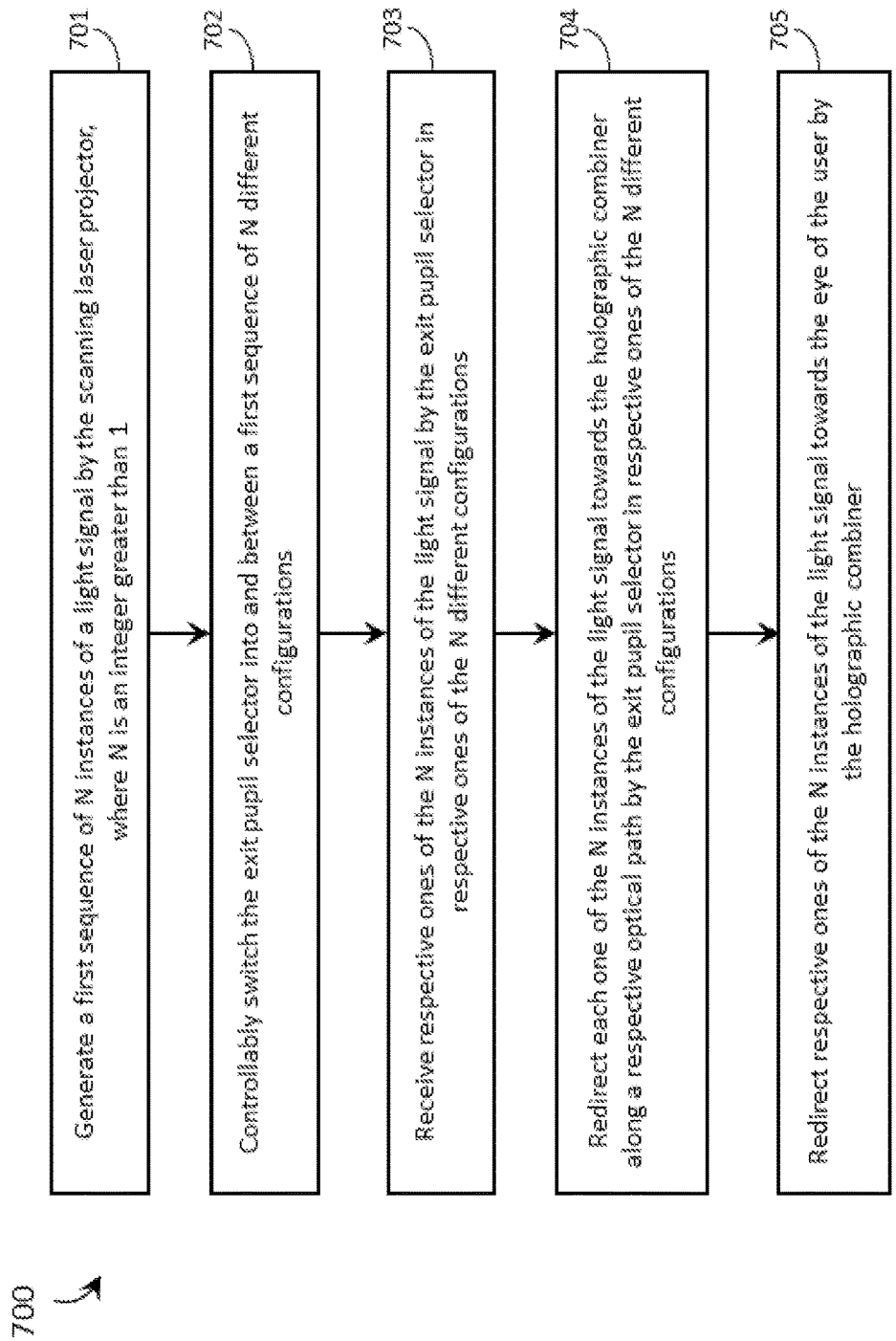
FIG. 7 is a flow-diagram showing a method of operating a wearable heads-up display in accordance with the present systems, devices, and methods.

FIG. 7 is a flow-diagram showing a method 700 of operating a WHUD in accordance with the present systems, devices, and methods. The WHUD may be substantially similar to WHUD 100, WHUD 200, or WHUD 300 (as appropriate based on the descriptions of the specific acts that follow) and generally includes a SLP, an exit pupil selector, and a holographic combiner. Method 700 includes five acts 701, 702, 703, 704, and 705 though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 700, the term "user" refers to a person that is wearing the WHUD.

At 701, the SLP of the WHUD generates a first sequence of N instances of a light signal, where N is an integer greater than 1. The light signal may represent a complete image or a portion of an image. For example, the light signal may represent one or more pixel(s) of an image. Each respective instance of the light signal may or may not be individually tuned to accommodate optical distortions that may apply to the particular optical path the light signal will follow.

At 702, the exit pupil selector controllably switches into and between a first sequence of N different configurations. Switching of the exit pupil selector through the first sequence of N configurations may be controlled by another component of the WHUD, such as a processor communicatively coupled to a non-transitory processor-readable storage medium or memory that stores processor-executable exit pupil selector control data, and may or may not be done at a resonance frequency for the exit pupil selector (e.g., for at least one dynamic optical element of the exit pupil selector). As previously described, the exit pupil selector may controllably switch into the first configuration via any or all forms of movement, including without limitation: a translation of at least one optical element, a rotation of at least one optical element, and/or a displacement of at least one optical element.

At 703, the exit pupil selector receives respective ones of the N instances of the light signal in respective ones of the N different configurations. That is, the exit pupil selector receives a first instance of the light signal while the exit pupil selector is in the first configuration, a second instance of the light signal while the exit pupil selector is in a second configuration, and so on for all N instances in all N configurations.

At 704, the exit pupil selector in each respective one of the N different configurations redirects a respective one of the N instances of the light signal towards the holographic combiner along a respective optical path. That is, the exit pupil selector in a first configuration redirects a first instance of the light signal towards the holographic combiner along a first optical path, the exit pupil selector in a second configuration redirects a second instance of the light signal towards the holographic combiner along a second optical path, and so on for all N instances in all N configurations. Generally, the exit pupil selector in each respective one of the N different configurations may redirect a respective one of the N instances of the light signal towards the holographic combiner effectively from respective ones of N spatially-separated virtual positions for the SLP, with each virtual position for the SLP corresponding to a respective optical path between the exit pupil selector and the holographic combiner.

At 705, the holographic combiner redirects respective ones of the N instances of the light signal towards the eye of the user (e.g., converges respective ones of the N instances of the light signal towards respective ones of N exit pupils at or proximate the eye of the user). Depending on the specific implementation, the holographic combiner may or may not redirect respective ones of the N instances of the light signal spatially in parallel with one another towards N respective regions of the eye of the user.

In some implementations, the holographic combiner may include a single hologram that converges N instances of the light signal towards respective exit pupils at the eye of the user based on the angle of incidence (at the holographic combiner) of each instance of the light signal resulting from the particular optical path along which the instance of the light signal travelled from the exit pupil selector to the holographic combiner. Even in such implementations, the holographic combiner may comprise at least two wavelength multiplexed holograms to respectively playback for (e.g., perform the redirecting and/or converging of act 705) at least two components of each of the N instances of the light signal having different wavelengths, such as at least two color components of each of the N instances of the light signal. For example, the SLP may comprise a red laser diode, a green laser diode, and a blue laser diode and the light signal may comprise a red component, a green component, and a blue component. In this case, the holographic combiner may comprise a red hologram, a green hologram, and a blue hologram and: the red hologram may converge a respective red component of each one of the N instances of the light signal that is received from the exit pupil selector to a respective one of the N exit pupils at or proximate the eye of the user, the green hologram may converge a respective green component of each one of the N instances of the light signal that is received from the exit pupil selector to a respective one of the N exit pupils at or proximate the eye of the user, and the blue hologram may converge a respective blue component of each one of the N instances of the light signal that is received from the exit pupil selector to a respective one of the N exit pupils at or proximate the eye of the user.

In some implementations, the holographic combiner may include at least two multiplexed holograms and each hologram may converge a respective one of the N instances of the light signal that is received from the exit pupil selector to a respective exit pupil at or proximate the eye of the user. Continuing on the example above, the holographic combiner may include at least two angle-multiplexed red holograms, at least two angle-multiplexed green holograms, and at least two angle-multiplexed blue holograms. In this case, a respective angle-multiplexed red hologram may converge a respective red component of each one of the N instances of the light signal that is received from the exit pupil selector to a respective one of the N exit pupils at or proximate the eye of the user, a respective angle-multiplexed green hologram may converge a respective green component of each one of the N instances of the light signal that is received from the exit pupil selector to a respective one of the N exit pupils at or proximate the eye of the user, and a respective angle-multiplexed blue hologram may converge a respective blue component of each one of the N instances of the light signal that is received from the exit pupil selector to a respective one of the N exit pupils at or proximate the eye of the user.

Method 700 may be extended in various ways. For example, the SLP may generate at least a second sequence (e.g., one or more additional sequences) of N instances of a light signal, the exit pupil selector may controllably switch into and between at least a second sequence of N different configurations, the exit pupil selector may receive respective ones of the at least a second sequence of N instances of the light signal in respective ones of the N different configurations and redirect each light signal in the at least a second sequence of N instances of the light signal towards the holographic combiner along a respective optical path, and the holographic combiner may redirect respective ones of the at least a second sequence of N instances of the light signal towards the eye of the user.

Furthermore, as previously described, the WHUD may include an eye tracker, in which case the eye tracker may determine a gaze direction of the eye of the user, the exit pupil selector may controllably switch into a particular one of the N different configurations based on the gaze direction of the eye of the user determined by the eye tracker, and the holographic combiner may redirect at least one of the N instances of the light signal towards a region of the eye of the user that contains the pupil of the eye of the user (e.g., towards an exit pupil that aligns with or overlaps the pupil of the eye of the user).

In accordance with the present systems, devices, and methods, the eyebox of a retina-scanning projector may be expanded by replication of one or more exit pupils. In this approach, a given exit pupil may have a defined size that is about equal to or smaller than the diameter of the eye's pupil, such as about 4 mm or less (e.g., about 2 mm), so that all light from an image enters the eye when the exit pupil impinges on (e.g., e.g., aligns with or overlies) the user's (physical) pupil. However, when the user moves their eye, alignment between the exit pupil and the user's pupil may be lost and the projected image may disappear from the user's field of view. Thus, in the "eyebox expansion through exit pupil replication" approaches described herein, multiple exit pupils may be projected and tiled over the user's eye so that at least one exit pupil aligns with the user's eye for multiple, many, most, or all eye positions.

Throughout this specification and the appended claims, the term "about" is sometimes used in relation to specific values or quantities. For example, fast-convergence within "about 2 cm." Unless the specific context requires otherwise, the term about generally means±15%.

The "exit pupil selector" described herein is an optical device. A non-limiting example of an exit pupil selector comprising a rotatable and translatable MEMS-based mirror is illustrated in (and described with reference to) FIG. 5; however, the present systems, devices, and methods are not intended to be limited to the exemplary implementation of an exit pupil selector from FIG. 5. An exit pupil selector as described herein may comprise any number and/or arrangement of optical elements (including dynamic optical elements and/or static optical elements) such as mirrors, lenses, diffraction gratings, beam-splitters, prisms, half-silvered surfaces, dichroics, dielectric coatings, and/or any other optical device(s) that a person of skill in the art would employ to select the exit pupil as described herein. A person of skill in the art will appreciate that the exit pupil selector described herein may employ a wide range of different optical device(s), individually or in combination, depending on the requirements of the specific implementation. Accordingly, the present systems, devices, and methods are generic to all implementations in which an optical device or arrangement of optical devices that select the exit pupil as described herein.

A person of skill in the art will appreciate that the present systems, devices, and methods may be applied or otherwise incorporated into WHUD architectures that employ one or more light source(s) other than a SLP. For example, in some implementations the SLP described herein may be replaced by another light source, such as a light source comprising one or more light-emitting diodes ("LEDs"), one or more organic LEDs ("OLEDs"), one or more digital light processors ("DLPs"). Such non-laser implementations may advantageously employ additional optics to collimate, focus, and/or otherwise direct projected light signals. Unless the specific context requires otherwise, a person of skill in the art will appreciate that references to a "SLP" throughout the present systems, devices, and methods are representative and other light sources (combined with other optics, as necessary) may be applied or adapted to serve the same general purpose as the SLPs described herein.

A person of skill in the art will appreciate that the present systems, devices, and methods may be applied or otherwise incorporated into WHUD architectures that employ one or more transparent combiner(s) other than a holographic combiner. For example, in some implementations the holographic combiner described herein may be replaced by a non-holographic device that serves substantially the same general purpose, such as prismatic film, a film that carries a microlens array, and/or a waveguide structure. Such non-holographic implementations may or may not employ additional optics. Unless the specific context requires otherwise, a person of skill in the art will appreciate that references to a "holographic combiner" throughout the present systems, devices, and methods are representative and that other transparent combiners (combined with other optics, as necessary) may be applied or adapted for application to serve the same general purpose as the holographic combiners described herein.

A person of skill in the art will appreciate that the various embodiments for eyebox expansion by exit pupil replication described herein may be applied in non-WHUD applications. For example, the present systems, devices, and methods may be applied in non-wearable heads-up displays and/or in other projection displays, including virtual reality displays, in which the holographic combiner need not necessarily be transparent.

In binocular implementations (i.e., implementations in which display content is projected into both eyes of the user), the total field of view may be increased by deliberately projecting a different field of view to each eye of the user. The two fields of view may overlap, so that both eyes see content at the center of the field of view while the left eye sees more content at the left of the field of view and the right eye sees more content at the right of the field of view.

In some implementations that employ multiple exit pupils, all exit pupils may optionally be active at all times (allowing for temporal separation). Alternatively, implementations that also employ eye-tracking, may activate only the exit pupil that corresponds to where the user is looking (based on eye-tracking) while one or more exit pupil(s) that is/are outside of the user's field of view may be deactivated.

In some implementations, the scan range of the projector can be actively changed to increase resolution in the direction the eye is looking or in the occupied exit pupil. Such is an example of heterogeneous image resolution as described in U.S. Provisional Patent Application Ser. No. 62/134,347.

Eyebox expansion may advantageously enable a user to see displayed content while gazing in a wide range of directions. Furthermore, eyebox expansion may also enable a wider variety of users having a wider range of eye arrangements to adequately see displayed content via a given WHUD. Anatomical details such as interpupillary distance, eye shape, relative eye positions, and so on can all vary from user to user. The various eyebox expansion methods described herein may be used to render a WHUD more robust over (and therefore more usable by) a wide variety of users having anatomical differences. In order to even further accommodate physical variations from user to user, the various WHUDs described herein may include one or more mechanical structure(s) that enable the user to controllably adjust the physical position and/or alignment of one or more exit pupil(s) relative to their own eye(s). Such mechanical structures may include one or more hinge(s), dial(s), flexure(s), tongue and groove or other slidably-coupled components, and the like. Alternatively, the approaches taught herein may advantageously avoid the need for inclusion of such additional mechanical structures, allowing a smaller package and less weight than might otherwise be obtainable.

In some implementations, one or more optical fiber(s) may be used to guide light signals along some of the paths illustrated herein.

The various implementations described herein may, optionally, employ the systems, devices, and methods for preventing eyebox degradation described in U.S. Provisional Patent Application Ser. No. 62/288,947.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

The various implementations of WHUDs described herein may include any or all of the technologies described in U.S. Provisional Patent Application Ser. No. 62/117,316, U.S. Provisional Patent Application Ser. No. 62/156,736, and/or U.S. Provisional Patent Application Ser. No. 62/242,844.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Provisional Patent Application Ser. No. 62/214,600, U.S. Provisional Patent Application Ser. No. 62/268,892, U.S. Provisional Patent Application Ser. No. 62/167,767, U.S. Provisional Patent Application Ser. No. 62/271,135, U.S. Provisional Patent Application Ser. No. 62/245,792, U.S. Provisional Patent Application Ser. No. 62/281,041, U.S. Provisional Patent Application Ser. No. 62/134,347, U.S. Provisional Patent Application Ser. No. 62/288,947, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, U.S. Provisional Patent Application Ser. No. 62/117,316, U.S. Provisional Patent Application Ser. No. 62/156,736, and U.S. Provisional Patent Application Ser. No. 62/242,844, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display comprising:
a support structure that in use is worn on a head of a user;
a holographic combiner carried by the support structure, wherein the holographic combiner is positioned within a field of view of an eye of the user when the support structure is worn on the head of the user;
a scanning laser projector carried by the support structure, the scanning laser projector comprising a laser module to produce light signals and at least one scan mirror to reflect the light signals to select regions of the holographic combiner;
an exit pupil selector carried by the support structure and positioned in an optical path between the at least one scan mirror and the holographic combiner, the exit pupil selector controllably switchable into and between respective ones of N different discrete orientations, where N is an integer greater than 1, wherein in each one of the N different discrete orientations the exit pupil selector is positioned and oriented to receive at least one light signal generated by the scanning laser projector and redirect the at least one light signal towards the holographic combiner effectively from a respective one of N discrete spatially-separated virtual positions for the scanning laser projector, and wherein the holographic combiner comprises at least one hologram positioned and oriented to, for each one of the N different discrete orientations of the exit pupil selector, converge light signals received from the exit pupil selector to a respective one of N discrete exit pupils at or proximate the eye of the user; and
an eye tracker carried by the support structure and communicatively coupled to the exit pupil selector, the eye tracker positioned and oriented to determine a gaze direction of the eye of the user, wherein the exit pupil selector is controllably switchable into and between respective ones of the N different discrete orientations based on the gaze direction of the eye of the user determined by the eye tracker.

2. The wearable heads-up display of claim 1 wherein the exit pupil selector is controllably switchable into and between respective ones of the N different discrete orientations by at least one form of movement selected from a group consisting of: a translation of at least one optical element of the exit pupil selector, a rotation of at least one optical element of the exit pupil selector, and a displacement of at least one optical element of the exit pupil selector.

3. The wearable heads-up display of claim 1 wherein the exit pupil selector comprises at least one dynamic optical element selected from a group consisting of: at least one microelectromechanical systems ("MEMS") based optical element and at least one piezo-based optical element.

4. The wearable heads-up display of claim 1 wherein the support structure has a shape of an eyeglasses frame.

5. The wearable heads-up display of claim 4, further comprising:
a prescription eyeglass lens, wherein the holographic combiner is carried by the prescription eyeglass lens.

6. The wearable heads-up display of claim 1 wherein the holographic combiner includes at least N multiplexed holograms, and wherein for each one of the N different discrete orientations of the exit pupil selector, a respective one of the at least N multiplexed holograms converges light signals received from the exit pupil selector to a respective one of the N discrete exit pupils at or proximate the eye of the user.

7. The wearable heads-up display of claim 1 wherein:
the scanning laser projector includes a red laser diode, a green laser diode, and a blue laser diode; and
the holographic combiner includes a wavelength-multiplexed holographic combiner that includes at least one red hologram, at least one green hologram, and at least one blue hologram, and wherein for each one of the N different discrete orientations of the exit pupil selector:
the at least one red hologram converges a red component of light signals received from the exit pupil selector to a respective one of the N discrete exit pupils at or proximate the eye of the user, the at least one green hologram converges a green component of light signals received from the exit pupil selector to a respective one of the N discrete exit pupils at or proximate the eye of the user, and the at least one blue hologram converges a blue component of light signals received from the exit pupil selector to a respective one of the N discrete exit pupils at or proximate the eye of the user.

8. The wearable heads-up display of claim 7 wherein the holographic combiner includes a wavelength-multiplexed and angle-multiplexed holographic combiner that includes at least N angle-multiplexed red holograms, at least N angle-multiplexed green holograms, and at least N angle-multiplexed blue holograms, and wherein for each one of the N different discrete orientations of the exit pupil selector:
a respective one of the at least N angle-multiplexed red holograms converges a red component of light signals received from the exit pupil selector to a respective one of the N discrete exit pupils at or proximate the eye of the user, a respective one of the at least N angle-multiplexed green holograms converges a green component of light signals received from the exit pupil selector to a respective one of the N discrete exit pupils at or proximate the eye of the user, and a respective one of the at least N angle-multiplexed blue holograms converges a blue component of light signals received from the exit pupil selector to a respective one of the N discrete exit pupils at or proximate the eye of the user.

9. The wearable heads-up display of claim 1 wherein the optical path between the scanning laser projector and the holographic combiner includes a total scan range θ of the scanning laser projector, and wherein for each one of the N different discrete orientations of the exit pupil selector, the exit pupil selector is positioned and oriented to receive all light signals corresponding to a sweep of the total scan range θ by the scanning laser projector and redirect all light signals corresponding to the sweep of the total scan range θ of the scanning laser projector towards the holographic combiner effectively from a respective one of the N discrete spatially-separated virtual positions for the scanning laser projector.

10. The wearable heads-up display of claim 1 wherein the at least one light signal includes an image comprising at least two pixels.

11. The wearable heads-up display of claim 10 wherein in each one of the N different discrete orientations the exit pupil selector is positioned and oriented to receive the image generated by the scanning laser projector and redirect the image towards the holographic combiner effectively from a respective one of the N discrete spatially-separated virtual positions for the scanning laser projector, and wherein at least one hologram of the holographic combiner is positioned and oriented to redirect the image received from the exit pupil selector towards one of the N discrete exit pupils at or proximate the eye of the user.

12. The wearable heads-up display of claim 1, wherein the exit pupil selector comprises at least one dynamic optical element.

13. The wearable heads-up display of claim 12, wherein the at least one dynamic optical element includes at least one of MEMS-based lens, piezo-based lens, reflector, partial reflector, prism, diffractor, diffraction grating, and mirror.

14. A wearable heads-up display comprising:
a support structure that in use is worn on a head of a user;
a holographic combiner carried by the support structure, wherein the holographic combiner is positioned within a field of view of an eye of the user when the support structure is worn on the head of the user;
a scanning laser projector carried by the support structure, the scanning laser projector comprising a laser module to produce light signals and at least one scan mirror to reflect the light signals to select regions of the holographic combiner; and
an exit pupil selector carried by the support structure and positioned in an optical path between the at least one scan mirror and the holographic combiner, the exit pupil selector controllably switchable into and between respective ones of N different discrete orientations, where N is an integer greater than 1, wherein in each one of the N different discrete orientations the exit pupil selector is positioned and oriented to receive at least one light signal generated by the scanning laser projector and redirect the at least one light signal towards the holographic combiner along a respective optical path between the exit pupil selector and the holographic combiner, and wherein the holographic combiner comprises at least one hologram positioned and oriented to, for each one of the N different discrete orientations of the exit pupil selector, converge light signals received from the exit pupil selector to a respective one of N discrete exit pupils at or proximate the eye of the user; and
an eye tracker carried by the support structure and communicatively coupled to the exit pupil selector, the eye tracker positioned and oriented to determine a gaze direction of the eye of the user, wherein the exit pupil selector is controllably switchable into and between respective ones of the N different discrete orientations based on the gaze direction of the eye of the user determined by the eye tracker.

15. The wearable heads-up display of claim 14, wherein the exit pupil selector comprises at least one dynamic optical element.

16. A method of operating a wearable heads-up display, the wearable heads-up display including a scanning laser projector, a controllably switchable exit pupil selector, an eye tracker communicatively coupled to the exit pupil selector, and a holographic combiner positioned within a field of view of an eye of a user when the wearable heads-up display is worn on a head of the user, the method comprising:

determining a gaze direction of the eye of the user by the eye tracker;

controllably switching the exit pupil selector into a first discrete orientation based on the gaze direction of the eye of the user determined by the eye tracker;

generating a first light signal by a laser module of the scanning laser projector and reflecting the first light signal by at least one scan mirror of the scanning laser projector;

receiving the first light signal reflected by the at least one scan mirror by the exit pupil selector in the first discrete orientation;

redirecting the first light signal towards the holographic combiner effectively from a first discrete virtual position for the scanning laser projector by the exit pupil selector in the first discrete orientation;

redirecting the first light signal towards a first discrete exit pupil at the eye of the user by the holographic combiner;

determining the gaze direction of the eye of the user by the eye tracker;

controllably switching the exit pupil selector into a second discrete orientation based on the gaze direction of the eye of the user determined by the eye tracker;

generating a second light signal by the scanning laser projector;

receiving the second light signal by the exit pupil selector in the second discrete orientation;

redirecting the second light signal towards the holographic combiner effectively from a second discrete virtual position for the scanning laser projector by the exit pupil selector in the second discrete orientation, the second discrete virtual position spatially-separated from the first discrete virtual position; and redirecting the second light signal towards a second discrete exit pupil at the eye of the user by the holographic combiner, the second discrete exit pupil spatially-separated from the discrete first exit pupil.

\* \* \* \* \*